US012645558B2

(12) United States Patent
Urabe et al.

(10) Patent No.: US 12,645,558 B2
(45) Date of Patent: Jun. 2, 2026

(54) CLASSIFICATION DEVICE, CLASSIFICATION METHOD, AND CLASSIFICATION PROGRAM

(71) Applicant: NTT, Inc., Tokyo (JP)

(72) Inventors: Yuki Urabe, Musashino (JP); Kimio Tsuchikawa, Musashino (JP); Fumihiro Yokose, Musashino (JP); Ryo Uchida, Musashino (JP); Sayaka Yagi, Musashino (JP)

(73) Assignee: NTT, Inc., Tokyo (JP)

( * ) Notice: Subject to any disclaimer, the term of this patent is extended or adjusted under 35 U.S.C. 154(b) by 537 days.

(21) Appl. No.: 18/277,464

(22) PCT Filed: Dec. 8, 2021

(86) PCT No.: PCT/JP2021/045212
§ 371 (c)(1),
(2) Date: Aug. 16, 2023

(87) PCT Pub. No.: WO2022/176333
PCT Pub. Date: Aug. 25, 2022

(65) Prior Publication Data
US 2024/0126675 A1 Apr. 18, 2024

(30) Foreign Application Priority Data

Feb. 18, 2021 (WO) ................. PCT/JP2021/006214

(51) Int. Cl.
*G06F 11/34* (2006.01)
*G06F 18/2431* (2023.01)
(52) U.S. Cl.
CPC ...... *G06F 11/3476* (2013.01); *G06F 18/2431* (2023.01)

(58) Field of Classification Search
None
See application file for complete search history.

(56) References Cited

U.S. PATENT DOCUMENTS

2006/0069955 A1    3/2006  Oka et al.
2006/0129547 A1*   6/2006  Yamamoto ............. H04N 21/21
                                              707/999.005
(Continued)

FOREIGN PATENT DOCUMENTS

JP          2009-31931 A1      2/2009
JP          4484643 B2         4/2010
(Continued)

OTHER PUBLICATIONS

Yokose et al., "Business visualization technology contributing to DX promotion," NTT Technical Journal, Feb. 2020, 72-75, 12 pages (with machine translation).
(Continued)

*Primary Examiner* — Nelson S. Giddins
(74) *Attorney, Agent, or Firm* — Fish & Richardson P.C.

(57) ABSTRACT

A classification device includes processing circuitry configured to acquire an operation log related to operation information and identify each operation performed by a user using the operation log, create a vector of each operation based on a co-occurrence relationship between operations identified, calculate a similarity between a predetermined number of operations adjacent to each other in chronological order by using the vector of each operation created, determine a division point of operations by using the similarity calculated and divide a time-series operation into operation sets based on the division point, and classify the operation sets divided into classes based on a number of types of operations common to the operation sets.

9 Claims, 31 Drawing Sheets

(56) References Cited

U.S. PATENT DOCUMENTS

2020/0285737 A1 *   9/2020   Kraus ................... G06F 21/552
2023/0291743 A1 *   9/2023   Shua ..................... H04L 63/102

FOREIGN PATENT DOCUMENTS

WO        WO2019060327  A1      3/2019
WO        WO2021024145  A1      2/2021

OTHER PUBLICATIONS

Oka et al., "Anomaly Detection Using Layered Networks Based on Eigen Co-occurrence Matrix," In Proceedings of the 7th International Symposium on Recent Advances in Intrusion Detection (RAID 2004), France, Sep. 15-17, 2004, 15 pages.

* cited by examiner

Fig. 1

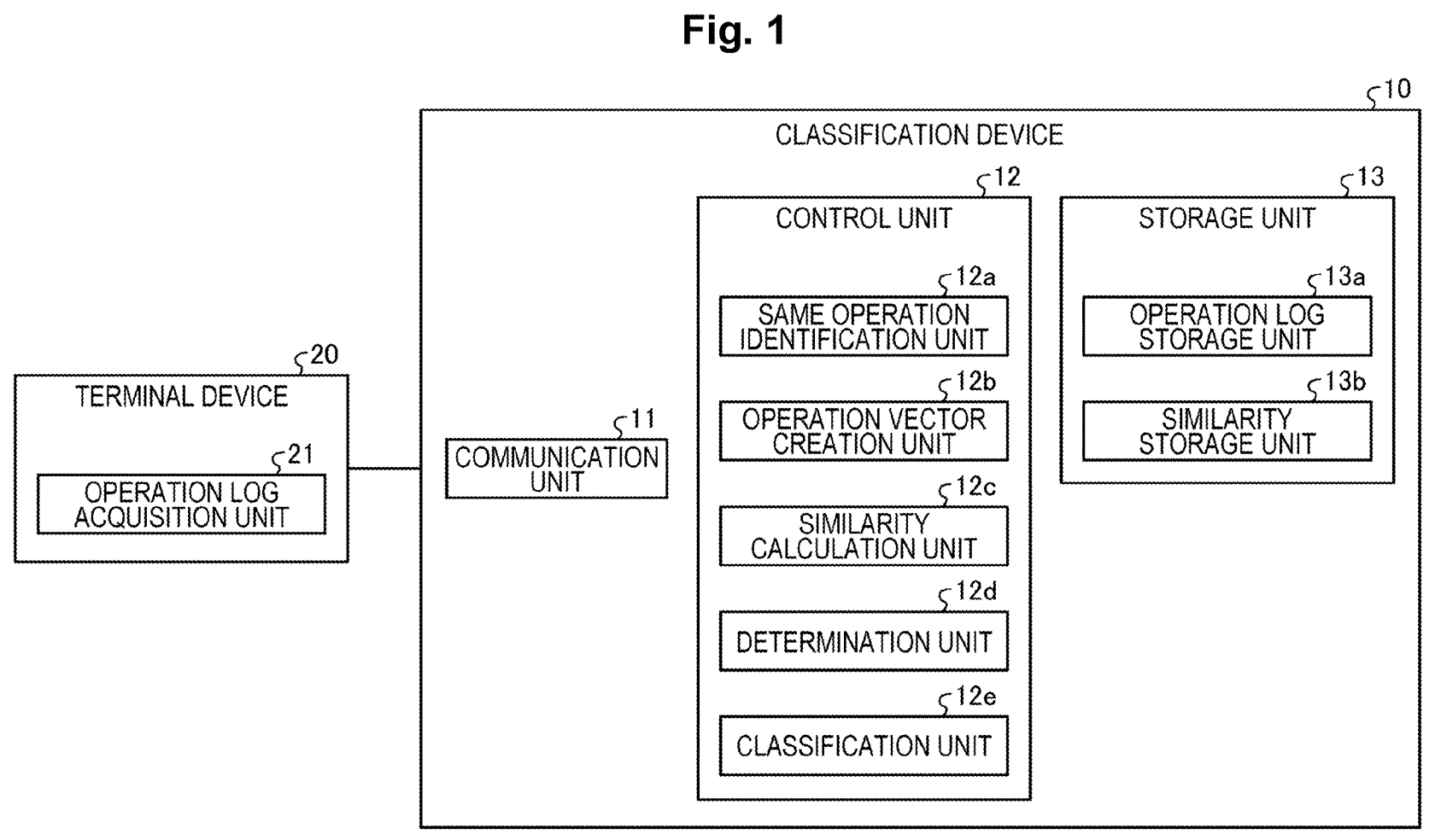

CLASSIFICATION DEVICE ~10

STORAGE UNIT ~13

OPERATION LOG STORAGE UNIT ~13a

SIMILARITY STORAGE UNIT ~13b

CONTROL UNIT ~12

SAME OPERATION IDENTIFICATION UNIT ~12a

OPERATION VECTOR CREATION UNIT ~12b

SIMILARITY CALCULATION UNIT ~12c

DETERMINATION UNIT ~12d

CLASSIFICATION UNIT ~12e

COMMUNICATION UNIT ~11

TERMINAL DEVICE ~20

OPERATION LOG ACQUISITION UNIT ~21

Fig. 4

| OPERATION TIME | USER | APPLICATION INFORMATION | WINDOW INFORMATION | OPERATION PART | CAPTURED IMAGE | OPERATION POSITION |
|---|---|---|---|---|---|---|
| 2018/9/25 10:15:23 | USER A | Internet Explorer.exe | WEB PAGE 1 | BUTTON a | img1.png | (500, 600, 30, 20) |
| 2018/9/25 10:19:10 | USER A | Internet Explorer.exe | WEB PAGE 1 | TEXT BOX b | img2.png | (500, 700, 100, 40) |
| 2018/9/25 10:22:08 | USER A | Internet Explorer.exe | WEB PAGE 1 | BUTTON c | img3.png | (500, 900, 30, 20) |
| 2018/9/25 10:24:48 | USER A | Internet Explorer.exe | WEB PAGE 2 | TEXT BOX d | img5.png | (300, 400, 100, 40) |
| 2018/9/25 10:29:01 | USER A | Internet Explorer.exe | WEB PAGE 2 | SELECTION BOX e | img6.png | (500, 400, 60, 20) |
| 2018/9/25 13:42:25 | USER A | Internet Explorer.exe | WEB PAGE 2 | BUTTON f | img7.png | (300, 600, 30, 20) |
| 2018/9/25 13:44:10 | USER A | Internet Explorer.exe | WEB PAGE 1 | BUTTON c | img8.png | (300, 700, 30, 20) |
| 2018/9/25 13:49:12 | USER B | Excel.exe | FILE 1 | CELL B4 | img9.png | (400, 500, 30, 15) |
| 2018/9/25 13:52:12 | USER B | Excel.exe | FILE 1 | CELL B5 | img10.png | (400, 600, 30, 15) |
| 2018/9/25 13:56:25 | USER B | Excel.exe | FILE 1 | CELL B6 | img11.png | (400, 700, 30, 15) |
| ... | ... | ... | ... | ... | ... | ... |

Fig. 5

| OPERATION TIME | USER | APPLICATION INFORMATION | WINDOW INFORMATION | OPERATION PART | CAPTURED IMAGE | OPERATION POSITION | OPERATION CONTENT |
|---|---|---|---|---|---|---|---|
| 2018/9/25 10:15:23 | USER A | Internet Explorer.exe | WEB PAGE 1 | BUTTON a | img1.png | (500, 600, 30, 20) | WEB PAGE 1 + BUTTON a |
| 2018/9/25 10:19:10 | USER A | Internet Explorer.exe | WEB PAGE 1 | TEXT BOX b | img2.png | (500, 700, 100, 40) | WEB PAGE 1 + TEXT BOX b |
| 2018/9/25 10:22:08 | USER A | Internet Explorer.exe | WEB PAGE 1 | BUTTON c | img3.png | (500, 900, 30, 20) | WEB PAGE 1 + BUTTON c |
| 2018/9/25 10:24:48 | USER A | Internet Explorer.exe | WEB PAGE 2 | TEXT BOX d | img5.png | (300, 400, 100, 40) | WEB PAGE 2 + TEXT BOX d |
| 2018/9/25 10:29:01 | USER A | Internet Explorer.exe | WEB PAGE 2 | SELECTION BOX e | img6.png | (500, 400, 60, 20) | WEB PAGE 2 + SELECTION BOX e |
| 2018/9/25 13:42:25 | USER A | Internet Explorer.exe | WEB PAGE 2 | BUTTON f | img7.png | (300, 600, 30, 20) | WEB PAGE 2 + BUTTON f |
| 2018/9/25 13:44:10 | USER A | Internet Explorer.exe | WEB PAGE 1 | BUTTON c | img8.png | (300, 700, 30, 20) | WEB PAGE 2 + BUTTON g |
| 2018/9/25 13:49:12 | USER B | Excel.exe | FILE 1 | CELL B4 | img9.png | (400, 500, 30, 15) | FILE 1 + CELL B4 |
| 2018/9/25 13:52:12 | USER B | Excel.exe | FILE 1 | CELL B5 | img10.png | (400, 600, 30, 15) | FILE 1 + CELL B5 |
| 2018/9/25 13:56:25 | USER B | Excel.exe | FILE 1 | CELL B6 | img11.png | (400, 700, 30, 15) | FILE 1 + CELL B6 |
| ... | ... | ... | ... | ... | ... | ... | ... |

Fig. 6

| OPERATION TIME | OPERATION CONTENT |
|---|---|
| 2018/9/25 10:15:23 | WEB PAGE 1+BUTTON a |
| 2018/9/25 10:19:10 | WEB PAGE 1+TEXT BOX b |
| 2018/9/25 10:22:08 | WEB PAGE 1+BUTTON c |
| 2018/9/25 10:24:48 | WEB PAGE 2+TEXT BOX d |
| 2018/9/25 10:29:01 | WEB PAGE 2+SELECTION BOX e |
| 2018/9/25 10:42:25 | WEB PAGE 2+BUTTON f |
| 2018/9/25 10:44:10 | WEB PAGE 2+BUTTON g |
| 2018/9/25 10:49:12 | FILE 1+CELL B4 |
| 2018/9/25 10:52:12 | FILE 1+CELL B5 |
| 2018/9/25 10:56:25 | FILE 1+CELL B6 |
| 2018/9/25 11:02:10 | WEB PAGE 1+TEXT BOX b |
| 2018/9/25 11:04:15 | WEB PAGE 1+BUTTON a |
| 2018/9/25 11:05:30 | WEB PAGE 1+BUTTON c |
| 2018/9/25 11:06:27 | WEB PAGE 2+SELECTION BOX e |
| 2018/9/25 11:07:48 | WEB PAGE 2+TEXT BOX d |
| 2018/9/25 11:08:35 | WEB PAGE 2+BUTTON g |
| 2018/9/25 11:09:14 | FILE 2+CELL A2 |
| 2018/9/25 11:09:57 | FILE 2+CELL A4 |
| 2018/9/25 11:10:36 | FILE 2+CELL A5 |
| 2018/9/25 11:12:57 | WEB PAGE 1+BUTTON a |
| 2018/9/25 11:15:38 | WEB PAGE 1+TEXT BOX b |
| 2018/9/25 11:16:05 | WEB PAGE 1+BUTTON c |
| 2018/9/25 11:16:43 | WEB PAGE 1+TEXT BOX b |
| 2018/9/25 11:17:16 | WEB PAGE 2+SELECTION BOX e |
| 2018/9/25 11:18:46 | WEB PAGE 2+TEXT BOX d |
| 2018/9/25 11:19:59 | WEB PAGE 2+BUTTON f |
| 2018/9/25 11:23:29 | WEB PAGE 2+BUTTON g |
| ... | ... |

Fig. 7

CO-OCCURRENCE MATRIX WHEN n = 2

| | WEB PAGE 1+ BUTTON a | WEB PAGE 1+ TEXT BOX b | WEB PAGE 1+ BUTTON c | WEB PAGE 2+ TEXT BOX d | WEB PAGE 2+ SELECTION BOX e | WEB PAGE 2+ BUTTON f | FILE 1+ CELL B4 | ... |
|---|---|---|---|---|---|---|---|---|
| WEB PAGE 1+ BUTTON a | 0 | 3 | 3 | 0 | 1 | 0 | 0 | |
| WEB PAGE 1+ TEXT BOX b | 3 | 1 | 3 | 1 | 0 | 0 | 0 | |
| WEB PAGE 1+ BUTTON c | 3 | 3 | 0 | 3 | 3 | 0 | 0 | |
| WEB PAGE 2+ TEXT BOX d | 0 | 2 | 2 | 0 | 3 | 2 | 0 | |
| WEB PAGE 2+ SELECTION BOX e | 1 | 1 | 3 | 3 | 0 | 2 | 0 | |
| WEB PAGE 2+ BUTTON f | 0 | 0 | 0 | 2 | 2 | 0 | 1 | |
| FILE 1+ CELL B4 | 0 | 0 | 0 | 0 | 0 | 1 | 0 | |
| ... | | | | | | | | |

Fig. 8

VECTOR OF OPERATION$_i$: $v_i$

CENTROID VECTOR OF (OPERATION$_{i-m}$, ..., OPERATION$_i$) $= \dfrac{v_{i-m} + \cdots + v_i}{m}$ CENTROID VECTOR OF (OPERATION$_{i+1}$, ..., OPERATION$_{i+1+m}$) $= \dfrac{v_{i+1} + \cdots + v_{i+m+1}}{m}$ SIMILARITY BETWEEN PRECEDING AND SUBSEQUENT OPERATION SEQUENCES (Similarity)

CENTROID VECTOR OF PRECEDING OPERATION SEQUENCE: $v_{G\,PRECEDING}$

CENTROID VECTOR OF SUBSEQUENT OPERATION SEQUENCE: $v_{G\,SUBSEQUENT}$ $|V|$: MAGNITUDE OF VECTOR $$\text{Similarity}\left(v_{G\,PRECEDING},\, v_{G\,SUBSEQUENT}\right) = \frac{\sum_{j=1}^{|V|} v_{G\,PRECEDING\,j}\, v_{G\,SUBSEQUENT\,j}}{\sqrt{\sum_{j=1}^{|V|} v_{G\,PRECEDING\,j}}\, \sqrt{\sum_{j=1}^{|V|} v_{G\,SUBSEQUENT\,j}}}$$

| OPERATION ORDER | SIMILARITY |
|---|---|
| 1 | 0.998 |
| 2 | 0.989 |
| 3 | 0.977 |
| 4 | 0.955 |
| 5 | 0.723 |
| 6 | 0.359 |
| 7 | 0.625 |
| 8 | 0.789 |
| 9 | 0.985 |
| ... | ... |

Fig. 10

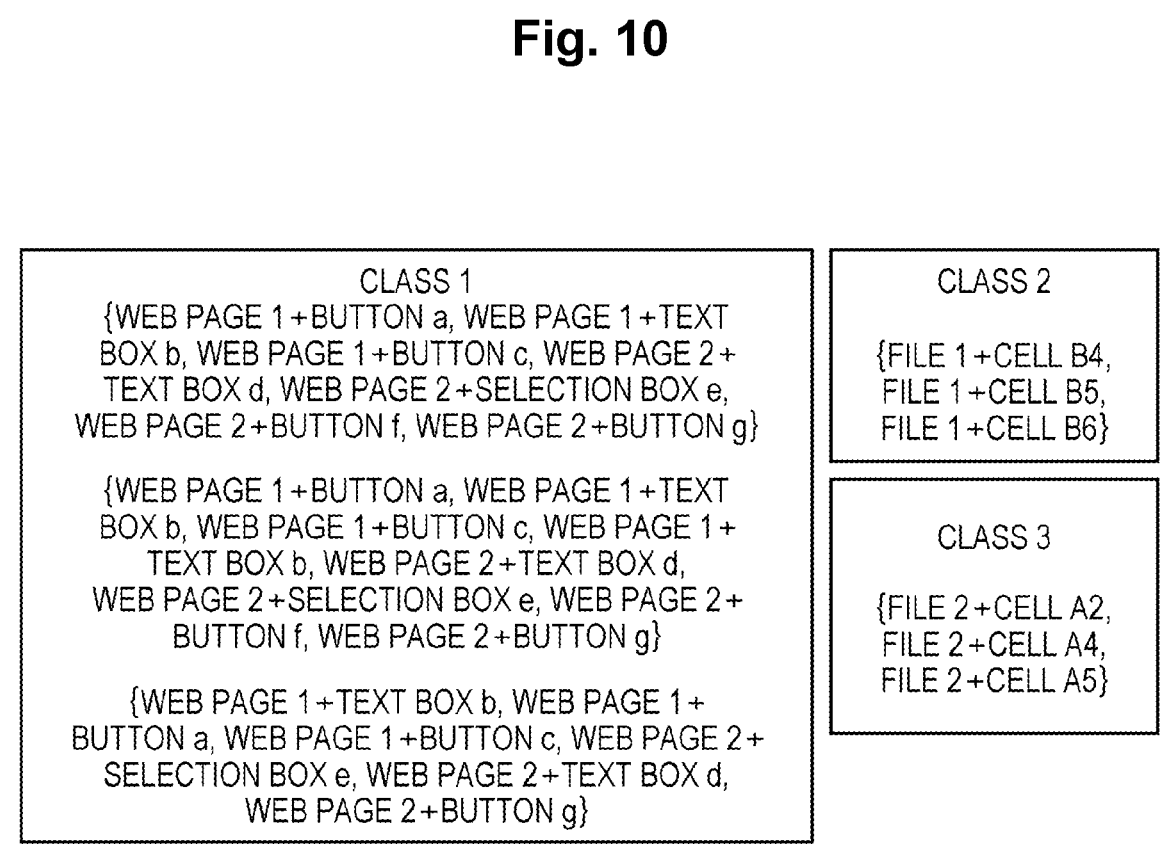

CLASS 1
{WEB PAGE 1+BUTTON a, WEB PAGE 1+TEXT
BOX b, WEB PAGE 1+BUTTON c, WEB PAGE 2+
TEXT BOX d, WEB PAGE 2+SELECTION BOX e,
WEB PAGE 2+BUTTON f, WEB PAGE 2+BUTTON g}

{WEB PAGE 1+BUTTON a, WEB PAGE 1+TEXT
BOX b, WEB PAGE 1+BUTTON c, WEB PAGE 1+
TEXT BOX b, WEB PAGE 2+TEXT BOX d,
WEB PAGE 2+SELECTION BOX e, WEB PAGE 2+
BUTTON f, WEB PAGE 2+BUTTON g}

{WEB PAGE 1+TEXT BOX b, WEB PAGE 1+
BUTTON a, WEB PAGE 1+BUTTON c, WEB PAGE 2+
SELECTION BOX e, WEB PAGE 2+TEXT BOX d,
WEB PAGE 2+BUTTON g}

CLASS 2

{FILE 1+CELL B4,
FILE 1+CELL B5,
FILE 1+CELL B6}

CLASS 3

{FILE 2+CELL A2,
FILE 2+CELL A4,
FILE 2+CELL A5}

Fig. 11

| NUMBER OF OPERATION TYPES | OPERATION SET |
|---|---|
| 7 | {WEB PAGE 1+BUTTON a, WEB PAGE 1+TEXT BOX b, WEB PAGE 1+BUTTON c, WEB PAGE 2+TEXT BOX d, WEB PAGE 2+SELECTION BOX e, WEB PAGE 2+BUTTON f, WEB PAGE 2+BUTTON g}, {WEB PAGE 1+BUTTON a, WEB PAGE 1+ TEXT BOX b, WEB PAGE 1+BUTTON c, WEB PAGE 1+ TEXT BOX b, WEB PAGE 2+TEXT BOX d, WEB PAGE 2+SELECTION BOX e, WEB PAGE 2+BUTTON f, WEB PAGE 2+BUTTON g} |
| 6 | {WEB PAGE 1+TEXT BOX b, WEB PAGE 1+BUTTON a, WEB PAGE 1+BUTTON c, WEB PAGE 2+SELECTION BOX e, WEB PAGE 2+TEXT BOX d, WEB PAGE 2+BUTTON g} |
| 3 | {FILE 1+CELL B4, FILE 1+CELL B5, FILE 1+CELL B6}, {FILE 2+CELL A2, FILE 2+CELL A4, FILE 2+CELL A5} |

Figure 12:
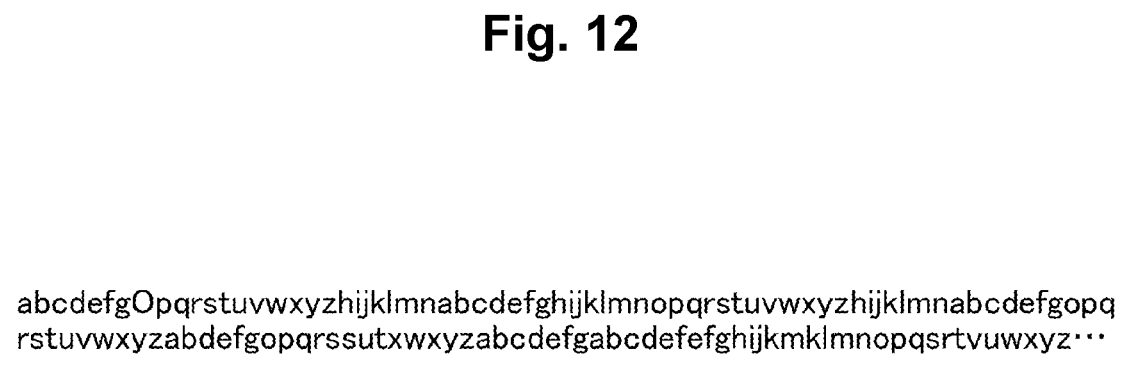

Fig. 12 abcdefgOpqrstuvwxyzhijklmnabcdefghijklmnopqrstuvwxyzhijklmnabcdefgopq
rstuvwxyzabdefgopqrssutxwxyzabcdefgabcdefefghijkmklmnopqsrtvuwxyz···

Fig. 13

|     | a | b | c | ··· | f | g | ··· | x | y | z |
|-----|---|---|---|-----|---|---|-----|---|---|---|
| a   | 0 | 6 | 5 |     | 1 | 1 |     | 2 | 2 | 2 |
| b   | 6 | 0 | 5 |     | 2 | 1 |     | 0 | 2 | 2 |
| ··· |   |   |   | ··· |   |   | ··· |   |   |   |
| f   | 0 | 0 | 6 |     | 2 | 7 |     | 0 | 0 | 0 |
| g   | 0 | 0 | 0 |     | 7 | 0 |     | 0 | 0 | 0 |
| ··· |   |   |   | ··· |   |   | ··· |   |   |   |

CO-OCCURRENCE MATRIX WHEN f IS TARGET OPERATION

|   | a | b | c | d | e | f | g | o | p | q | r | s | t | u |
|---|---|---|---|---|---|---|---|---|---|---|---|---|---|---|
| a |   |   |   |   |   |   |   |   |   |   |   |   |   |   |
| b |   |   |   |   |   |   |   |   |   |   |   |   |   |   |
| c |   |   |   |   |   |   |   |   |   |   |   |   |   |   |
| d |   |   |   |   |   |   |   |   |   |   |   |   |   |   |
| e |   |   |   |   |   |   |   |   |   |   |   |   |   |   |
| f | 0.03125 | 0.0625 | 0.125 | 0.25 | 0.5 |   | 0.5 | 0.25 | 0.125 | 0.0625 | 0.03125 |   |   |   |
| g |   |   |   |   |   |   |   |   |   |   |   |   |   |   |
| o |   |   |   |   |   |   |   |   |   |   |   |   |   |   |

Fig. 15

METHOD OF WEIGHTING FIVE OPERATIONS
BEFORE AND AFTER TARGET OPERATION f
SAME SCREEN=1
ANOTHER SCREEN=0.5

SCREEN A
a b c d e f g

SCREEN B
o p q r s t u ···

|   | a | b | c | d | e | f | g | o | p | q | r | s | t | u |
|---|---|---|---|---|---|---|---|---|---|---|---|---|---|---|
| a |   |   |   |   |   |   |   |   |   |   |   |   |   |   |
| b |   |   |   |   |   |   |   |   |   |   |   |   |   |   |
| c |   |   |   |   |   |   |   |   |   |   |   |   |   |   |
| d |   |   |   |   |   |   |   |   |   |   |   |   |   |   |
| e |   |   |   |   |   |   |   |   |   |   |   |   |   |   |
| f | 1 | 1 | 1 | 1 | 1 |   | 1 | 0.5 | 0.5 | 0.5 | 0.5 |   |   |   |
| g |   |   |   |   |   |   |   |   |   |   |   |   |   |   |
| o |   |   |   |   |   |   |   |   |   |   |   |   |   |   |

Fig. 16 abcdefgOpqrstuvwxyzhijklmnabcdefghijklmnopqrstuvwxyzhijklmnabcdefgopqrstuvwxyzabcdefgopqrssutxwxyzabcdefg abcdefefghijkmklmnopqsrtvuwxyz···

∇

Figure 16:
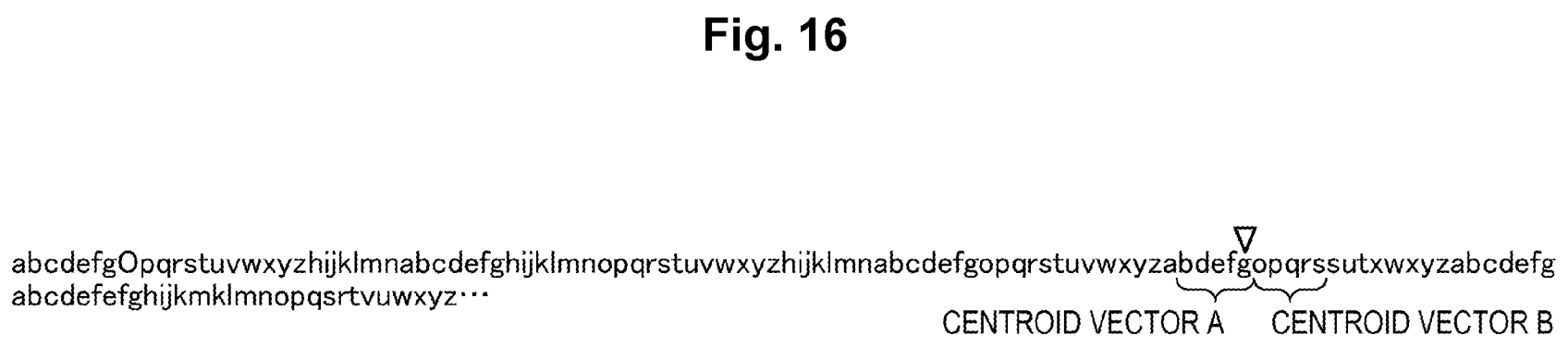

CENTROID VECTOR A    CENTROID VECTOR B

DIFFERENCE d = (START POSITION OF MONOTONICALLY DECREASING PART
− MINIMUM POINT) + (END POSITION OF MONOTONICALLY INCREASING PART
− MINIMUM POINT)

Figure 18:
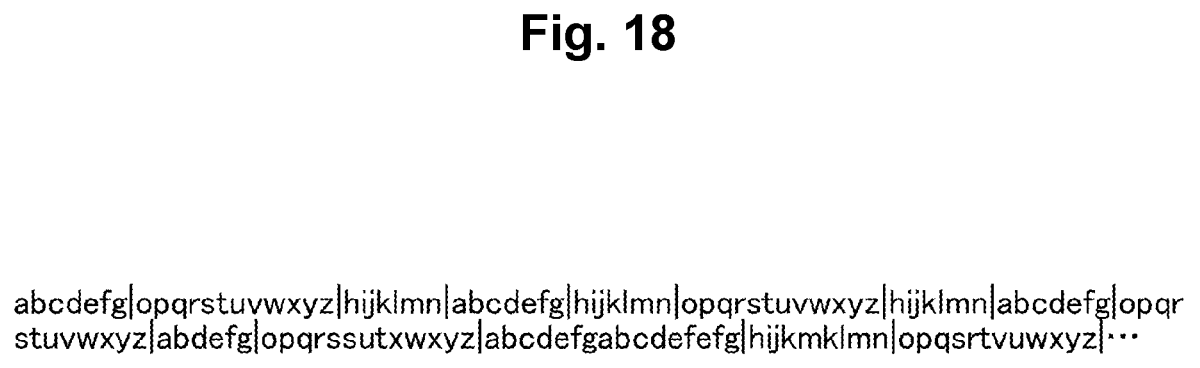

Fig. 18 abcdefg|opqrstuvwxyz|hijklmn|abcdefg|hijklmn|opqrstuvwxyz|hijklmn|abcdefg|opqr
stuvwxyz|abdefg|opqrssutxwxyz|abcdefgabcdefefg|hijkmklmn|opqsrtvuwxyz|···

Fig. 20

| NUMBER OF OPERATION TYPES | OPERATION SET |
|---|---|
| 12 | opqrstuvwxyz |
| 7 | abcdefgabcdefefg, hijkmklmn, abcdefg, hijklmn, abcdefg, hijklmn, hijklmn, abcdefg, |
| 6 | abdefg |

Fig. 26

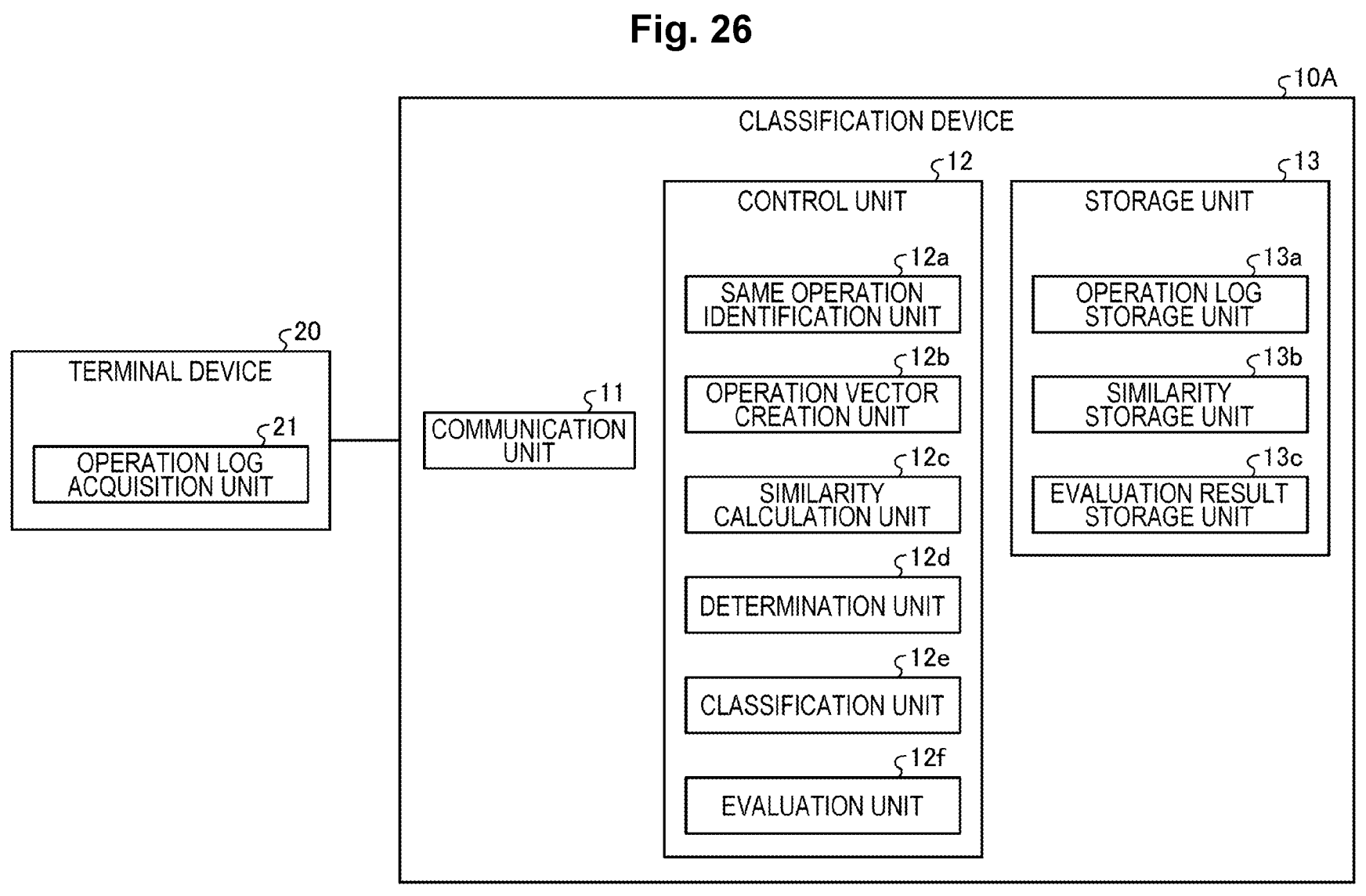

CLASSIFICATION DEVICE ~10A

STORAGE UNIT ~13

OPERATION LOG STORAGE UNIT ~13a

SIMILARITY STORAGE UNIT ~13b

EVALUATION RESULT STORAGE UNIT ~13c

CONTROL UNIT ~12

SAME OPERATION IDENTIFICATION UNIT ~12a

OPERATION VECTOR CREATION UNIT ~12b

SIMILARITY CALCULATION UNIT ~12c

DETERMINATION UNIT ~12d

CLASSIFICATION UNIT ~12e

EVALUATION UNIT ~12f

COMMUNICATION UNIT ~11

TERMINAL DEVICE ~20

OPERATION LOG ACQUISITION UNIT ~21

Fig. 27

| PARAMETER | | | | EVALUATION VALUE |
|---|---|---|---|---|
| n | m | D | T | |
| 10 | 40 | 0.20 | 0.70 | 0.31 |
| 40 | 18 | 0.13 | 0.70 | 0.55 |
| ... | ... | ... | ... | ... |

Fig. 28

| PARAMETER | RANGE |
|---|---|
| n | [1, 2, 3, ⋯, 50] |
| m | [1, 2, 3, ⋯, 50] |
| D | [0.1, 0.2, 0.3, 0.4, 0.5] |
| T | [0.1, 0.2, 0.3, 0.4, 0.5, 0.6, 0.7]<br>(WHEN HIERARCHICAL CLUSTERING IS USED) |

CLASSIFICATION DEVICE, CLASSIFICATION METHOD, AND CLASSIFICATION PROGRAM

CROSS-REFERENCE TO RELATED APPLICATIONS

This application is a National Stage application under 35 U.S.C. § 371 of International Application No. PCT/JP2021/045212, having an International Filing Date of Dec. 8, 2021, which claims priority to PCT/JP2021/006214, having an International Filing Date of Feb. 18, 2021.

The disclosure of the prior applications are considered part of the disclosure of this application, and are incorporated by reference in their entirety into this application.

TECHNICAL FIELD

The present invention relates to a classification device, a classification method, and a classification program.

BACKGROUND ART

In order to achieve effective business improvement in a company or the like, it is important to accurately grasp the target operations. A person in charge who performs operations performs a plurality of operations daily using an information terminal such as a PC or a tablet, and the operations performed via the information terminal include a plurality of works. Work performed by the PC refers to, for example, a series of information input operations (input into text box, click of button, and the like) necessary for performing operations.

In actual operations, there are various operation procedures due to various factors such as the person in charge and contents of orders. The operation procedure is basically defined by a manual. However, since the work content changes from that at the beginning of the manual creation or the person in charge performs work by a unique method, deviation from the manual may occur.

A business analyst needs to grasp what kind of work, how long it takes, and what kind of procedure (operation) the work is carried out as a premise of business improvement measure consideration. For example, in order to enhance the improvement effect by introducing robotic process automation (RPA), the type and amount of work performed in the operations are grasped, and RPA is introduced from work types with large work amounts to achieve the business improvement efficiently.

CITATION LIST

Non Patent Literature

Non Patent Literature 1: Fumihiro Yokose and 5 others, "Business visualization technology contributing to DX promotion", February 2020, NTT Technical Journal, pp. 72-75

SUMMARY OF INVENTION

Technical Problem

However, in the conventional technology, with the method of grasping the type and amount of work for improving business using RPA, there has been a problem that it may be difficult to easily and accurately grasp the actual operations of a person in charge in units of work including a series of operations. For example, in order to grasp the type and amount of work performed in the operations, there is a method of measuring the actual work on the basis of an operation log (information such as operation time, operation screen, and operation part) collected from a terminal of the person in charge. However, since the granularity is fine in units of operations, there is a problem that it takes time and effort to grasp the actual operations of the person in charge in units of work including a series of operations.

In addition, for example, a method of extracting a series of operations repeated many times from the operation log by dividing the operation log into groups of operations and creating and predicting a model in which the operation order in the group is learned is also conceivable. However, since the number of operations included in a work is different for each work, in the prediction of groups, only some of the series of works are extracted, and it is difficult to grasp from the start to the end of the series of works that is important in the consideration of RPA.

The present invention has been made in view of the above, and aims is to provide a classification device, a classification method, and a classification program capable of easily and accurately classifying a group of works from the start to the end.

Solution to Problem

In order to solve the above problems and achieve the object, a classification device includes: processing circuitry configured to: acquire an operation log related to operation information and identify each operation performed by a user using the operation log; create a vector of each operation based on a co-occurrence relationship between operations identified; calculate a similarity between a predetermined number of operations adjacent to each other in chronological order by using the vector of each operation created; determine a division point of operations by using the similarity calculated and divide a time-series operation into operation sets based on the division point; and classify the operation sets divided into classes based on a number of types of operations common to the operation sets.

A classification method is a classification method executed by a classification device, the classification method including: acquiring an operation log related to operation information and identifying each operation performed by a user using the operation log; creating a vector of each operation based on a co-occurrence relationship between operations identified; calculating a similarity between a predetermined number of operations adjacent to each other in chronological order by using the vector of each operation created; determining a division point of operations by using the similarity calculated and dividing a time-series operation into operation sets based on the division point; and classifying the operation sets divided into classes based on a number of types of operations common to the operation sets.

In addition, a non-transitory computer-readable recording medium stores therein a classification program that causes a computer to execute a process including: acquiring an operation log related to operation information and identifying each operation performed by a user using the operation log; creating a vector of each operation based on a co-occurrence relationship between operations identified; calculating a similarity between a predetermined number of operations adjacent to each other in chronological order by using the vector of each operation created; determining a division point of operations by using the similarity calculated and dividing a time-series operation into operation sets based on the division point; and classifying the operation sets divided into classes based on a number of types of operations common to the operation sets.

ADVANTAGEOUS EFFECTS OF INVENTION

According to the present invention, it is possible to easily and accurately classify a group of works from the start to the end.

BRIEF DESCRIPTION OF DRAWINGS

FIG. 1 is a block diagram illustrating an example of a configuration of a classification device.

FIG. 4 is a diagram illustrating an example of an operation log stored in an operation log storage unit.

FIG. 5 is a diagram illustrating an example of an operation log to which a column of operation content is added by a same operation identification unit.

FIG. 6 is a diagram illustrating an example of operation logs in chronological order.

FIG. 7 is a diagram illustrating an example of a co-occurrence matrix created by an operation vector creation unit.

FIG. 8 is a diagram for describing similarity calculation processing by a similarity calculation unit.

FIG. 10 is a diagram illustrating an example of a classification result by a classification unit.

FIG. 11 is a diagram illustrating an example of the number of operation types of each operation set.

FIG. 12 is a diagram illustrating an example of operation logs in chronological order.

FIG. 13 is a diagram illustrating an example of a co-occurrence matrix.

FIG. 14 is a diagram for describing an example of how to weight a co-occurrence matrix according to the distance.

FIG. 15 is a diagram for describing an example of how to weight a co-occurrence matrix depending on whether or not an operation has been performed in the same window.

FIG. 16 is a diagram for describing centroid vector calculation processing.

FIG. 18 is a diagram for describing an example of divided operation sets.

FIG. 20 is a diagram for describing operation sequence classification processing.

FIG. 26 is a block diagram illustrating an example of a configuration of a classification device according to a modification.

FIG. 27 is a diagram illustrating an example of parameters and evaluation values stored in an evaluation result storage unit.

FIG. 28 is a diagram for describing an example of a parameter setting condition.

DESCRIPTION OF EMBODIMENTS

Hereinafter, an embodiment of a classification device, a classification method, and a classification program according to the present application will be described in detail with reference to the drawings. The present invention is not limited to the embodiment described below.

Configuration of Classification Device

FIG. 1 is a block diagram illustrating an example of a configuration of a classification device. As illustrated in FIG. 1, a classification device 10 according to the present embodiment is connected to a terminal device 20 via a network (not illustrated). The classification device 10 is an information processing device that is implemented by, for example, a general-purpose computer such as a personal computer, acquires an operation log related to operation information, and performs processing of classifying the operation log for each work. Note that the classification device 10 may be any type of information processing device including a server.

The terminal device 20 is an information processing device used by a user. The user is, for example, a person in charge of business. For example, the person in charge of business uses various types of software such as a business system and a general-purpose application on the terminal device 20. Note that the terminal device 200 may be any type of information processing device including a client device such as a smartphone, a desktop PC, a laptop PC, or a tablet PC. While the classification device 10 and the terminal device 20 are separate devices in the example of FIG. 1, the terminal device 20 may have some or all of the functions of the classification device 10.

The terminal device 20 includes an operation log acquisition unit 21. The operation log acquisition unit 21 acquires an operation log of a user. For example, the operation log acquisition unit 21 acquires an operation log including an operation time, an operation part, an operation position, and the like at the timing of an operation event. The terminal device 20 transmits the acquired operation log to the classification device 10.

Figure 2:
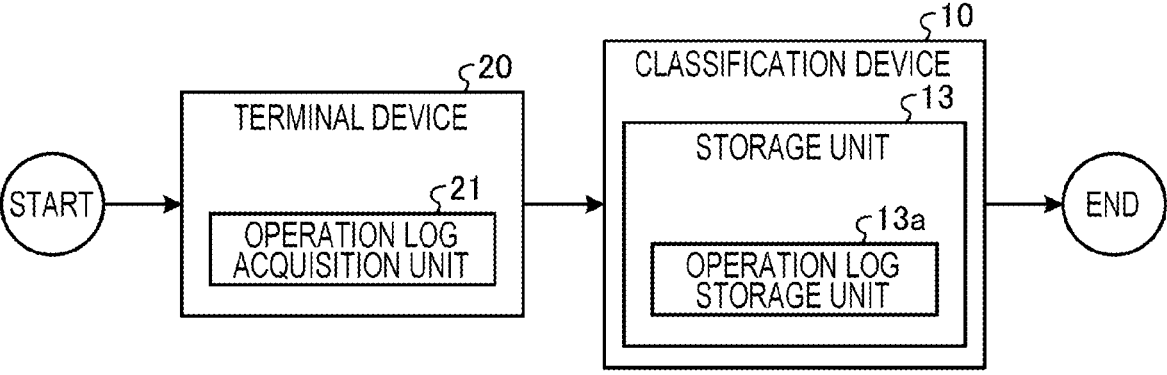
FIG. 2 is a diagram illustrating a processing process for processing of storing an operation log of a user.

Here, processing in which the classification device 10 stores the operation log of the user will be described with reference to FIG. 2. FIG. 2 is a diagram illustrating a processing process for processing of storing an operation log of a user. As illustrated in FIG. 2, the classification device 10 receives an operation log acquired by the operation log acquisition unit 21 of the terminal device 20 and stores the operation log in an operation log storage unit 13*a* of a storage unit 13. Note that a timing at which the classification device 10 and the terminal device 20 transmit and receive an operation log may be any timing. For example, transmission and reception may be performed at predetermined time intervals, or transmission and reception may be performed each time the operation log acquisition unit 21 acquires an operation log.

Figure 3:
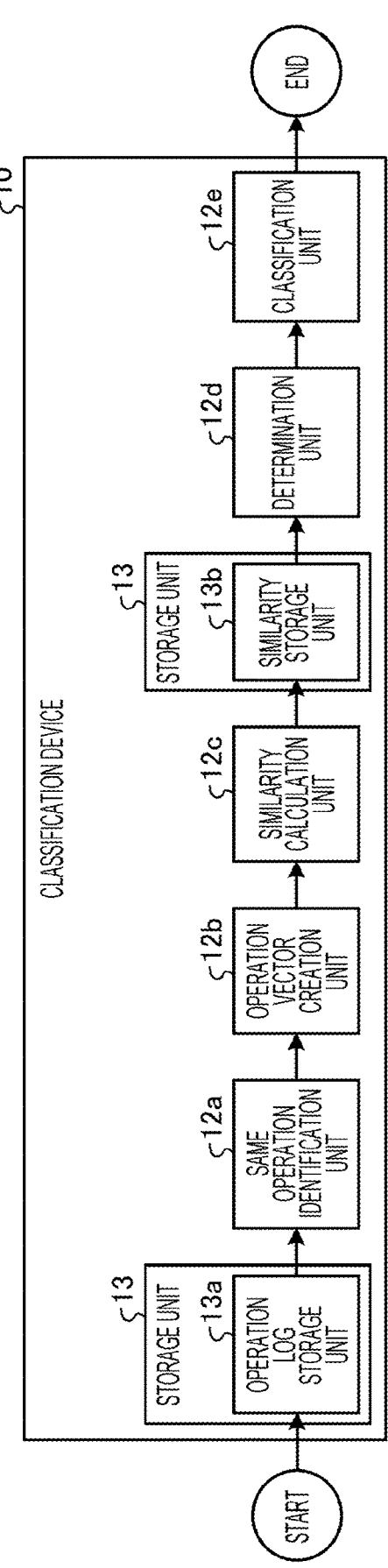
FIG. 3 is a diagram illustrating a processing process for processing of classifying an operation log for each work.

The classification device 10 includes a communication unit 11, a control unit 12, and the storage unit 13. FIG. 3 is a diagram illustrating a processing process for processing of classifying an operation log for each work. As illustrated in FIG. 3, the classification device 10 performs processing in the order of a same operation identification unit 12*a*, an operation vector creation unit 12*b*, and a similarity calculation unit 12*c* using the operation log stored in the operation log storage unit 13*a* of the storage unit 13, and stores a similarity calculated by the similarity calculation unit in a similarity storage unit 13*b* of the storage unit 13. Then, the classification device 10 performs processing in the order of a determination unit 12*d* and a classification unit 12*e* using the similarity stored in the similarity storage unit 13*b*, and classifies the operation log for each work. Hereinafter, processing of each unit included in the classification device 10 will be described.

The communication unit 11 is implemented by a network interface card (NIC) or the like, and controls communication between an external device and the control unit 12 via a telecommunication line such as a local area network (LAN) or the Internet. For example, the communication unit 11 receives an operation log from the terminal device 20.

The storage unit 13 stores data and programs necessary for various processing by the control unit 12, and includes the operation log storage unit 13*a* and the similarity storage unit 13*b*. For example, the storage unit 13 is a semiconductor memory element such as a random access memory (RAM) or a flash memory, or a storage device such as a hard disk or an optical disc.

The operation log storage unit 13*a* stores an operation log acquired from the terminal device 20. For example, as illustrated in FIG. 4, the operation log storage unit 13*a* stores, as an operation log, a table including columns of "operation time" indicating a time when an operation has been performed, "user" indicating a user who has performed the operation, "application information" indicating an application to be operated, "window information" indicating a window title or the like of a window to be operated, "operation part" indicating an operation part, "captured image" which is an image at the time of the operation, and "operation position" indicating a position where the operation has been performed. FIG. 4 is a diagram illustrating an example of an operation log stored in the operation log storage unit.

The similarity storage unit 13*b* stores a similarity for each operation order calculated by the similarity calculation unit 12*c* described later. For example, the similarity storage unit 13*b* stores a table associating the operation order with the similarity (see FIG. 8 described later).

The control unit 12 includes an internal memory for storing programs and required data defining various processing procedures and the like, and performs various processing by using the programs and data. For example, the control unit 12 includes the same operation identification unit 12*a*, the operation vector creation unit 12*b*, the similarity calculation unit 12*c*, the determination unit 12*d*, and the classification unit 12*e*. Here, the control unit 12 is an electronic circuit such as a central processing unit (CPU) or a micro processing unit (MPU), or an integrated circuit such as an application specific integrated circuit (ASIC) or a field programmable gate array (FPGA).

The same operation identification unit 12*a* acquires an operation log and identifies each operation performed by the user using the operation log. For example, as illustrated in FIG. 5, the same operation identification unit 12*a* reads the table of the operation log from the operation log storage unit 13*a*, adds an "operation content" column, adds window information and information of the operation part to the "operation content" column, and stores the information in the operation log storage unit 13*a*. FIG. 5 is a diagram illustrating an example of an operation log to which a column of operation content is added by the same operation identification unit. Then, the same operation identification unit 12*a* identifies that operations having the same "operation content" are operations of the same type.

As a specific example, in a case where there is a plurality of operations whose operation content is "web page 1+button a", the same operation identification unit 12*a* identifies these operations as operations of the same type. Note that the same operation identification unit 12*a* may add a column of an operation ID for uniquely identifying the type of operation, for example, together with the "operation content" column or instead of the "operation content" column in order to identify operations of the same type.

The operation vector creation unit 12*b* creates a vector of each operation on the basis of a co-occurrence relationship between operations identified by the same operation identification unit 12*a*. For example, for each operation identified by the same operation identification unit 12*a*, the operation vector creation unit 12*b* counts the number of times of other operations performed in a range of a predetermined number before and after the operation in an operation sequence performed in time series, creates a co-occurrence matrix indicating a co-occurrence relationship between the operations by using the counted number of times, and creates a vector of each operation on the basis of the co-occurrence matrix.

Here, processing of creating a co-occurrence matrix will be described with reference to examples of FIGS. 6 and 7. FIG. 6 is a diagram illustrating an example of operation logs in chronological order. FIG. 7 is a diagram illustrating an example of a co-occurrence matrix created by the operation vector creation unit. For example, as illustrated in FIG. 6, the operation vector creation unit 12*b* reads the "operation contents" added to the operation log in chronological order. Then, as illustrated in FIG. 7, the operation vector creation unit 12*b* creates a co-occurrence matrix in which n operations before and after each operation are counted. In the example of FIG. 7, the operation vector creation unit 12*b* creates a co-occurrence matrix in a case where n=2.

Then, the operation vector creation unit 12*b* generates a vector for each operation from the co-occurrence matrix. Regarding the generated vector, the magnitude of the vector is the number of types of operations, and each element includes the number of counts of n operations before and after the target operation. To describe by using the example of FIG. 7, for example, the operation vector creation unit 12*b* creates web page 1+button a=[0, 3, 3, 0, 1, 0, 0 . . . ] as a vector of the operation content "web page 1+button a", and creates web page 1+text box b=[3, 1, 3, 1, 0, 0, 0 . . . ] as a vector of the operation content "web page 1+text box b".

Furthermore, in a case where the type of operation identified by the same operation identification unit 12*a* is equal to or greater than a predetermined threshold, the operation vector creation unit 12b may create a vector of each operation using a predetermined dimension reduction method. That is, when a vector of each operation is created from a co-occurrence matrix of each operation, the length of the vector is the number of operation types, and the larger the number of operation types, the higher the calculation cost. Therefore, for example, the operation vector creation unit 12b may reduce the dimension of each operation vector using a dimension reduction method such as single value decomposition (SVD). As a result, the calculation cost can be reduced.

The similarity calculation unit 12c calculates the similarity between a predetermined number of operations adjacent to each other in chronological order using the vector of each operation created by the operation vector creation unit 12b. For example, the similarity calculation unit 12c calculates a centroid vector or a sum vector for a predetermined number of operation sequences adjacent to each other in chronological order using the vector of each operation created by the operation vector creation unit 12b, and calculates the similarity between the vectors.

Here, similarity calculation processing by the similarity calculation unit 12c will be described with reference to FIG. 8. FIG. 8 is a diagram for describing similarity calculation processing by the similarity calculation unit. For example, as illustrated in FIG. 8, the similarity calculation unit 12c reads operation logs in chronological order, and calculates a centroid vector or a sum vector using each of the operation vectors of the operation sequence (operation$_{i-m}$, . . . , operation$_i$) of the previous m operations including an operation$_i$ to be divided and the operation sequence (operation$_{i+1}$, . . . , operation$_{i+1+m}$) of m operations after the operation$_i$.

Then, the similarity calculation unit 12c calculates the similarity between the preceding and subsequent operation sequences by using a vector similarity calculation method such as cosine similarity or Euclidean distance. Thereafter, the similarity calculation unit 12c stores the operation order and the similarity in the similarity storage unit 13b. For example, "1" in the operation order refers to between the first operation and the second operation in time series.

Figure 9:
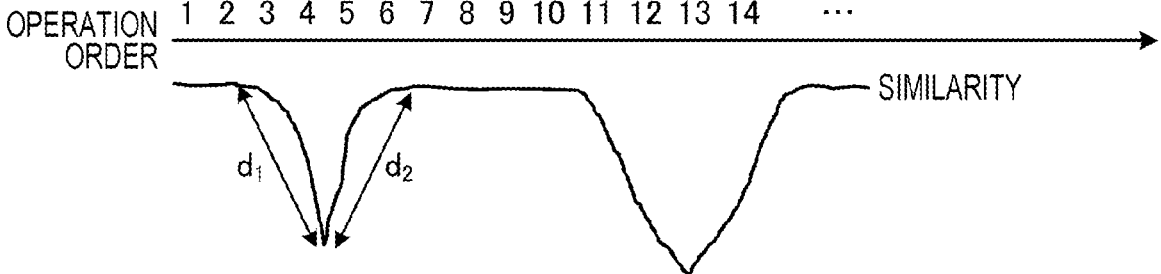
FIG. 9 is a diagram for describing operation log division processing by a determination unit.

The determination unit 12d determines a division point of each operation using the similarity calculated by the similarity calculation unit 12c, and divides a time-series operation into operation sets on the basis of the division point. FIG. 9 is a diagram for describing operation log division processing by the determination unit. For example, as illustrated in FIG. 9, the determination unit 12d reads the "operation order" and the "similarity" from the similarity storage unit 13b, and, if the similarity is calculated from the cosine similarity, finds a length ($d_1$) from the start of the decrease in similarity to the minimum point of the similarity and a length ($d_2$) from the minimum point to the end of the increase in similarity to calculate a depth ($d=d_1+d_2$) using the lengths. On the other hand, in a case where the similarity is calculated from the Euclidean distance, the determination unit 12d finds a length from the start of the increase in similarity to the maximum point of the similarity and a length from the maximum point to the end of the decrease in similarity to calculate the depth thereof.

Then, when the depth is equal to or greater than a threshold, the determination unit 12d sets the part of the minimum point (or maximum point) as the work division point and divides the operation log. The determination unit 12d repeats the processing until all the determination is made for all the operations in order. For example, as illustrated in FIG. 9, when determining that "4" of the operation order is the division point, the determination unit 12d divides between the fourth and fifth operation logs. Note that the processing of determining the division point is not limited to the case of determining whether the depth ($d=d_1+d_2$) is equal to or greater than a threshold, and the determination unit 12d may determine whether both the length (d1) from the start of decrease in similarity to the minimum point of similarity and the length ($d_2$) from the minimum point to the end of increase in similarity are equal to or greater than a predetermined threshold, and may determine that the part of the minimum point (or maximum point) is the division point of the work when both lengths are equal to or greater than the predetermined threshold.

The classification unit 12e classifies each operation set divided by the determination unit 12d into each class on the basis of the number of types of operations common to operation sets. For example, the classification unit 12e compares the types of operations of an operation set appearing in a classified class with the types of operations of an operation set to be classified, and calculates the number of common operation types. Then, the classification unit 12e classifies the classification target operation set into a class in which the number of common operation types is equal to or greater than a threshold and is the largest, and, if the number of common operation types is equal to or smaller than the threshold, classifies the operation set into a new class. As a result, for example, as illustrated in FIG. 10, the classification unit 12e classifies the divided operation sets into classes 1 to 3. FIG. 10 is a diagram illustrating an example of a classification result by the classification unit.

Furthermore, for example, the classification unit 12e may classify operation sets in descending order of the number of operation types. In this case, as illustrated in FIG. 11, the classification unit 12e obtains the number of operation types for each operation set, and classifies the operation sets in descending order of the number of operation types. FIG. 11 is a diagram illustrating an example of the number of operation types of each operation set. Note that the classification unit 12e is not limited to the case of classifying operation sets in descending order of the number of operation types, and may classify operation sets in chronological order, for example. Furthermore, as another method, the classification unit 12e may create, for each operation set, a vector in which the number of types of operations is set as the number of dimensions and operations appearing in the operation set are counted, and classify the operation set on the basis of a threshold using a method such as a hierarchical clustering method.

Hereinafter, with respect to a time-series operation illustrated in FIG. 12, a series of processing for the classification device 10 to classify the operation log for each work will be described using a specific example of FIGS. 13 to 19. FIG. 12 is a diagram illustrating an example of operation logs in chronological order. Each character illustrated in FIG. 12 indicates an operation identified by the same operation identification unit 12a, and the same character indicates the same type of operation. That is, the operation sequence illustrated in FIG. 12 means that operations are performed in the order of a, b, c, d, e, f . . . . Note that in the operation sequence of FIG. 12, "abcdefg" are operations of work 1, "hijklmn" are operations of work 2, "opqrstuvwxyz" are operations of work 3, and there are three types of classified works.

FIG. 13 is a diagram illustrating an example of a co-occurrence matrix. As illustrated in FIG. 13, the operation vector creation unit 12b creates a co-occurrence matrix using n operations before and after each operation. In the example of FIG. 13, n=3. A value of n is set as a range of preceding and subsequent operations determined to be co-occurring operations. In addition, regarding creation of the co-occurrence matrix, weighting may be performed depending on not only the count of the presence or absence of the operation but also the adjacency situation of the operations before and after the target operation and whether or not the operation is in the same window. As a result, the operation vector creation unit 12b can create a co-occurrence matrix in consideration of the actual operation situation, so that it is possible to more accurately perform processing of classifying work groups.

For example, for each operation identified by the same operation identification unit 12a, the operation vector creation unit 12b may create a co-occurrence matrix by using values obtained by weighting the number of times of other operations performed in a range of a predetermined number before and after the operation in an operation sequence performed in time series, according to the distances to the other operations, and create a vector of each operation on the basis of the co-occurrence matrix.

FIG. 14 is a diagram for describing an example of how to weight a co-occurrence matrix according to the distance. In the example of FIG. 14, it is assumed that n=5. For example, as illustrated in FIG. 14, when determining weights according to the distance between the target operation and another operation, in a case where the distance of the operation "e" and the operation "g" on both sides of the target operation "f" from the target operation "f" is "1" and the distance is "1", the operation vector creation unit 12b counts 0.5 as a weight and creates a co-occurrence matrix. Furthermore, for example, in a case where the distance of the operation "d" and the operation "o" from the target operation "f" is "2" and the distance is "2", the operation vector creation unit 12b counts 0.25 as a weight and creates a co-occurrence matrix.

In addition, the operation vector creation unit 12b may perform weighting and counting according to whether or not operations before and after the target operation have been performed in the same window (web page, file, or the like). For example, for each operation identified by the same operation identification unit 12a, the operation vector creation unit 12b may create a co-occurrence matrix by using values obtained by weighting the number of times of other operations performed in a range of a predetermined number before and after the operation in an operation sequence performed in time series, according to whether or not the other operations have been performed in the same window, and create a vector of each operation on the basis of the co-occurrence matrix. Note that in this case, for example, the same operation identification unit 12a may use application information of an operation log or a window title of the window information for identifying the operation to determine whether the previous and subsequent operations of the target operation are the same screen.

FIG. 15 is a diagram for describing an example of how to weight a co-occurrence matrix according to whether or not an operation has been performed in the same window. In the example of FIG. 15, it is assumed that n=5, operations abcdefg are operations on the same screen (window) A, and operations opqrstu are operations on the same screen B. For example, as illustrated in FIG. 15, in a case where the weight of the same window (screen) is "1" and the weight of another screen is "0.5", the operation vector creation unit 12b counts "1" as a weight for the operations abcdeg which are operations within five operations before and after the target operation "f" and on the same window as the target operation "f", and creates a co-occurrence matrix. Furthermore, the operation vector creation unit 12b counts "0.5" as a weight for the operations opqr which are operations within five operations before and after the target operation "f" and on a window different from that of the target operation "f", and creates a co-occurrence matrix.

Then, the operation vector creation unit 12b generates a vector of each operation from the co-occurrence matrix. For example, referring to the example of FIG. 13, the operation vector creation unit 12b creates an operation a=[0, 6, 5 . . . 1, 1, . . . 2, 2, 2] using the co-occurrence frequency with all the operations as the vector of the operation "a", for example. Furthermore, when the number of types of operations is large, the operation vector creation unit 12b may perform dimension reduction using SVD, and, for example, may perform dimension reduction to a 50 dimensional vector while holding features of 1000 types of operations.

Subsequently, the similarity calculation unit 12c reads the operation logs in chronological order, acquires an operation of m operations including the operation of the division determination target and an operation sequence of m operations after the operation of the division determination target, and calculates the similarity between the operation sequence (operation sequence A in FIG. 16) of m operations including the operation of the division determination target and the operation sequence (operation sequence B in FIG. 16) of m operations after the operation of the division determination target, the operation sequences adjacent to each other, by using the vector of each operation created by the operation vector creation unit 12b. Here, processing of calculating the centroid vector will be described with reference to FIG. 16. FIG. 16 is a diagram for describing centroid vector calculation processing. In the example of FIG. 16, it is assumed that m=5, and the operation "g" indicated by "∇" is set as the division determination target. In this case, the operation sequence A and the operation sequence B for which the similarity is to be calculated are the operation sequence A=bdefg and the operation sequence B=opqrs.

Then, the similarity calculation unit 12c acquires a vector (operation vector) of each operation in the operation sequence A, and calculates the center of gravity of the operation sequence A using the following Formula (1).

[Math. 1]

$$\text{Center of gravity of operation sequence A} = \frac{\text{operation vectors of } b, d, e, f, \text{ and } g}{m} \quad (1)$$

In addition, the similarity calculation unit 12c similarly acquires a vector (operation vector) of each operation in the operation sequence B, and calculates the center of gravity of the operation sequence B using the following Formula (2).

[Math. 2]

$$\text{Center of gravity of operation sequence B} = \frac{\text{operation vectors of } o, p, q, r, \text{ and } s}{m} \quad (2)$$

Then, the similarity calculation unit 12c calculates the similarity between the centroid vectors of the operation sequence A and the operation sequence B. For example, in a case where the cosine similarity is adopted as the calculation of the similarity, the similarity calculation unit 12c calculates the similarity between the centroid vectors of the operation sequence A and the operation sequence B using the following Formula (3).

[Math. 3]

$$\vec{a} = \text{centroid vector of operation sequence A} \qquad (3)$$

$$\vec{b} = \text{centroid vector of operation sequence B}$$

$$\cos(\vec{a} \cdot \vec{b}) = \frac{\sum_{i=1}^{|V|} a_i b_i}{\sqrt{\sum_{i=1}^{|V|} a_i^2} \sqrt{\sum_{i=1}^{|V|} b_i^2}}$$

$|V|$ is number of dimensions of centroid vector

Figure 17:
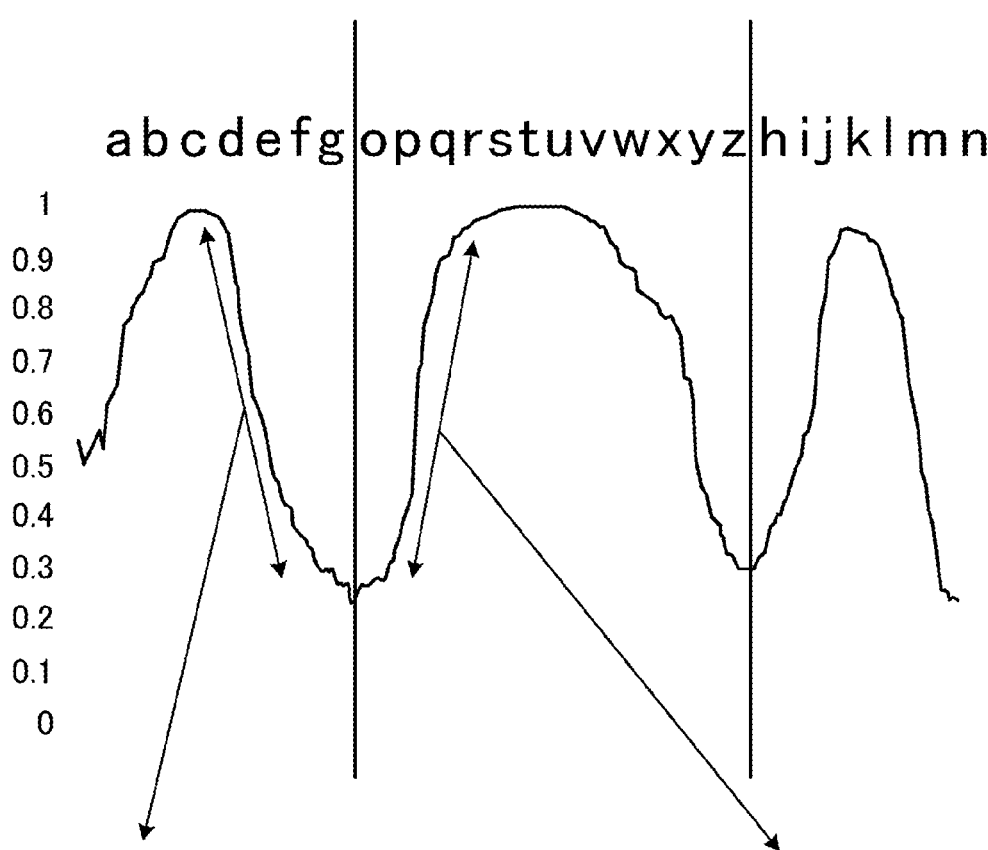
FIG. 17 is a diagram illustrating transition of similarity.

Then, the determination unit 12d determines a part having a difference (difference d) equal to or greater than a threshold among the similarities of the operation series before and after each operation in the operation log as a division point of the operation log, and divides the time-series operation into operation sets on the basis of the division point. FIG. 17 is a diagram illustrating transition of similarity. For example, as illustrated in FIG. 17, the determination unit 12d calculates the difference d as follows.

Difference d=(start position of monotonically decreasing part−minimum point)+(end position of monotonically increasing part−minimum point)

Then, when the difference d is equal to or greater than a threshold, the determination unit 12d determines that the part of the minimum point is a work division point. In the example of FIG. 17, the determination unit 12d determines that a point between the operation "g" corresponding to the part of the minimum point and the next operation "o" is a division point. In addition, the determination unit 12d determines that a point between the operation "z" corresponding to the part of the minimum point and the next operation "h" is a division point. Then, the determination unit 12d divides the operations on the basis of the division points, thereby dividing the time-series operation illustrated in FIG. 12 into a plurality of operation sets as illustrated in FIG. 18. In the example of FIG. 18, the determination unit 12d divides the time-series operation illustrated in FIG. 12 into an operation set "abcdefg", an operation set "opqrstuvwxyz", and an operation set "hijklmn", and so on. FIG. 18 is a diagram for describing an example of divided operation sets.

Figure 19:
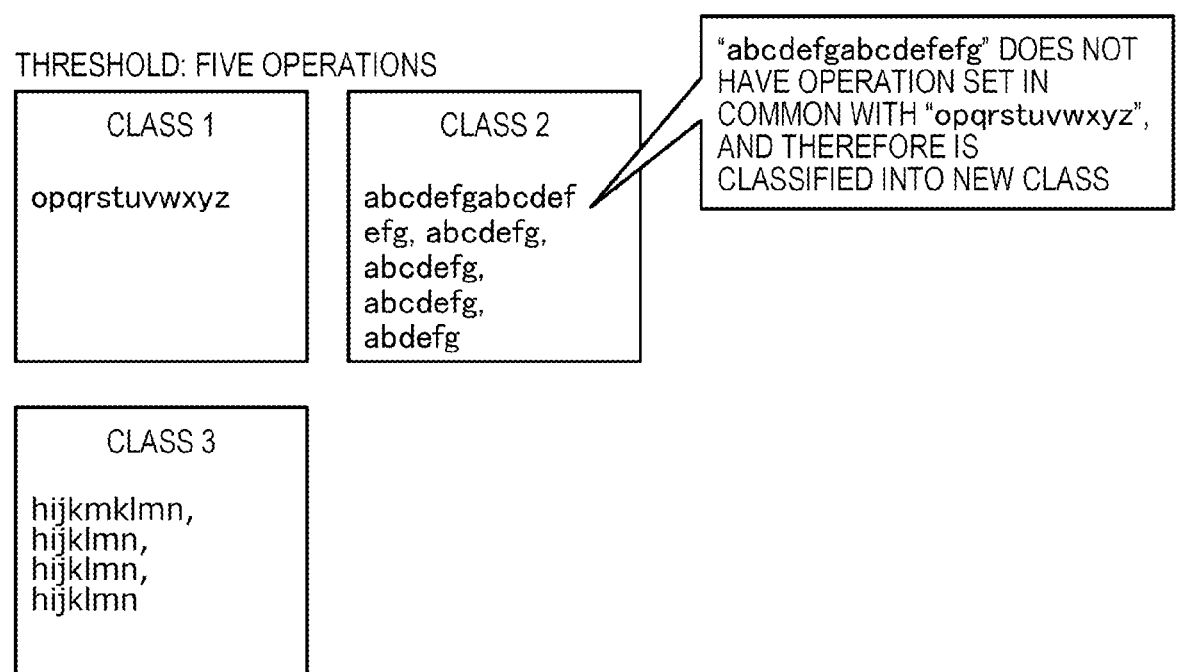
FIG. 19 is a diagram for describing operation sequence classification processing.

Subsequently, operation sequence classification processing will be described with reference to FIGS. 19 and 20. FIGS. 19 and 20 are diagrams for describing operation sequence classification processing. The classification unit 12e classifies each operation set divided by the determination unit 12d into each class on the basis of the number of types of operations common to operation sets. For example, the classification unit 12e compares the types of operations of an operation set appearing in a classified class with the types of operations of an operation set to be classified, and calculates the number of common operation types. Then, the classification unit 12e classifies the classification target operation set into a class in which the number of common operation types is equal to or greater than a threshold and is the largest, and, if the number of common operation types is equal to or smaller than the threshold, classifies the operation set into a new class. As a result, for example, as illustrated in FIG. 19, the classification unit 12e classifies the divided operation sets into classes 1 to 3.

Furthermore, for example, the classification unit 12e may classify operation sets in descending order of the number of operation types. In this case, as illustrated in FIG. 20, the classification unit 12e obtains the number of operation types for each operation set, starts the classification processing from the operation set "opqrstuvwxyz" having the largest number of operation types, and initially classifies the operation set as "class 1". Subsequently, the classification unit 12e compares the operation set "abcdefgabcdefefg" having the next largest number of operation types with "opqrstuvwxyz" classified into class 1, and calculates the number of common operation types (common operation set). Here, since the number of common operation types is "0", the classification unit 12e classifies the operation set "abcdefgabcdefefg" into a new class 2.

As described above, the classification device 10 can classify each operation into works by classifying the divided operation sets into classes. As described above, in the operation series of FIG. 12, each operation of "abcdefg" is an operation of work 1, each operation of "hijklmn" is an operation of work 2, and each operation of "opqrstuvwxyz" is an operation of work 3. In the example of FIG. 19, for example, the classification device 10 classifies the operation set "abcdefgabcdefefg" and the operation set "abcdefg" into class 2 as a group of a series of works in the same work type. Furthermore, for example, the classification device 10 classifies the operation set "opqrstuvwxyz" into class 1 as a group of a series of works in the same work type. Furthermore, for example, the classification device 10 classifies the operation set "hijkmklmn" and the operation set "hijklmn" into class 3 as a group of a series of works in the same work type. As described above, the classification device 10 can extract groups of a series of works from an operation log and classify the groups into work types.

Processing Procedure of Classification Device

Figure 21:
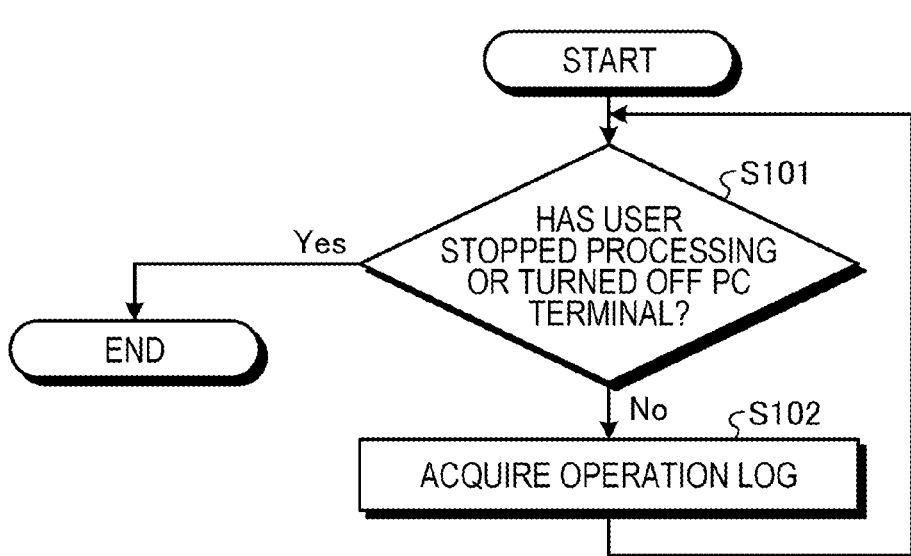
FIG. 21 is a flowchart illustrating an example of a processing procedure of operation log acquisition processing according to the embodiment.
Figure 22:
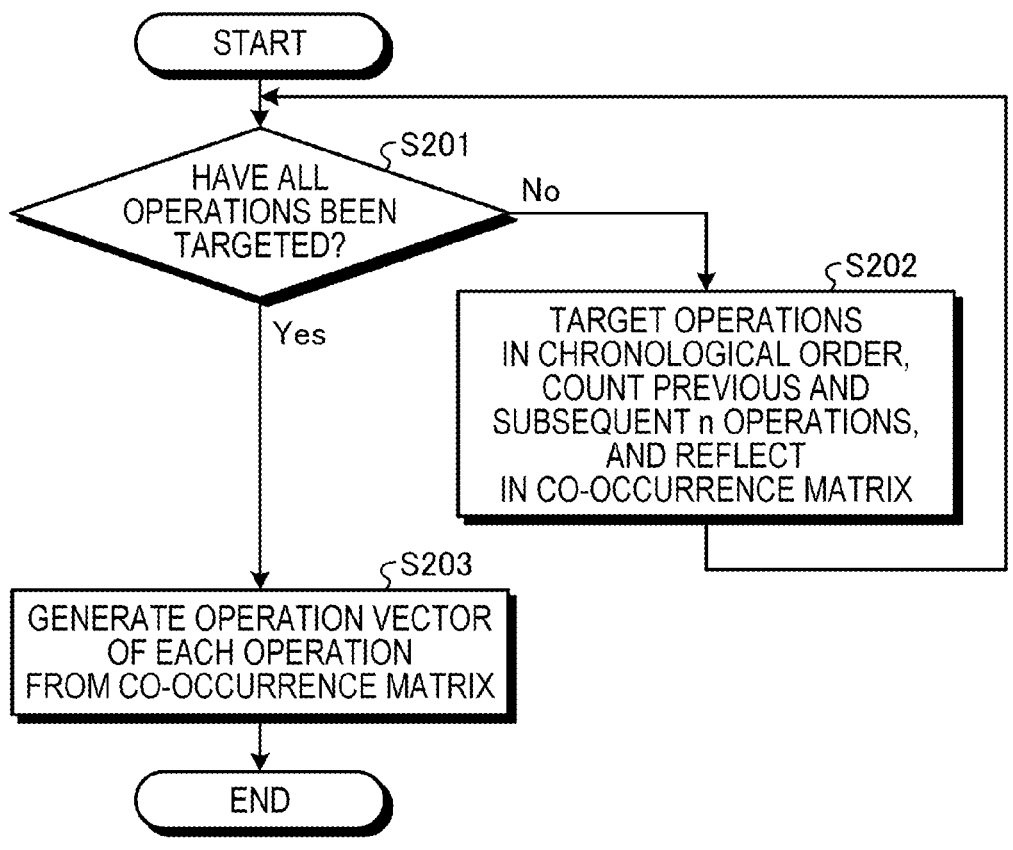
FIG. 22 is a flowchart illustrating an example of a processing procedure of operation vector generation processing according to the embodiment.
Figure 23:
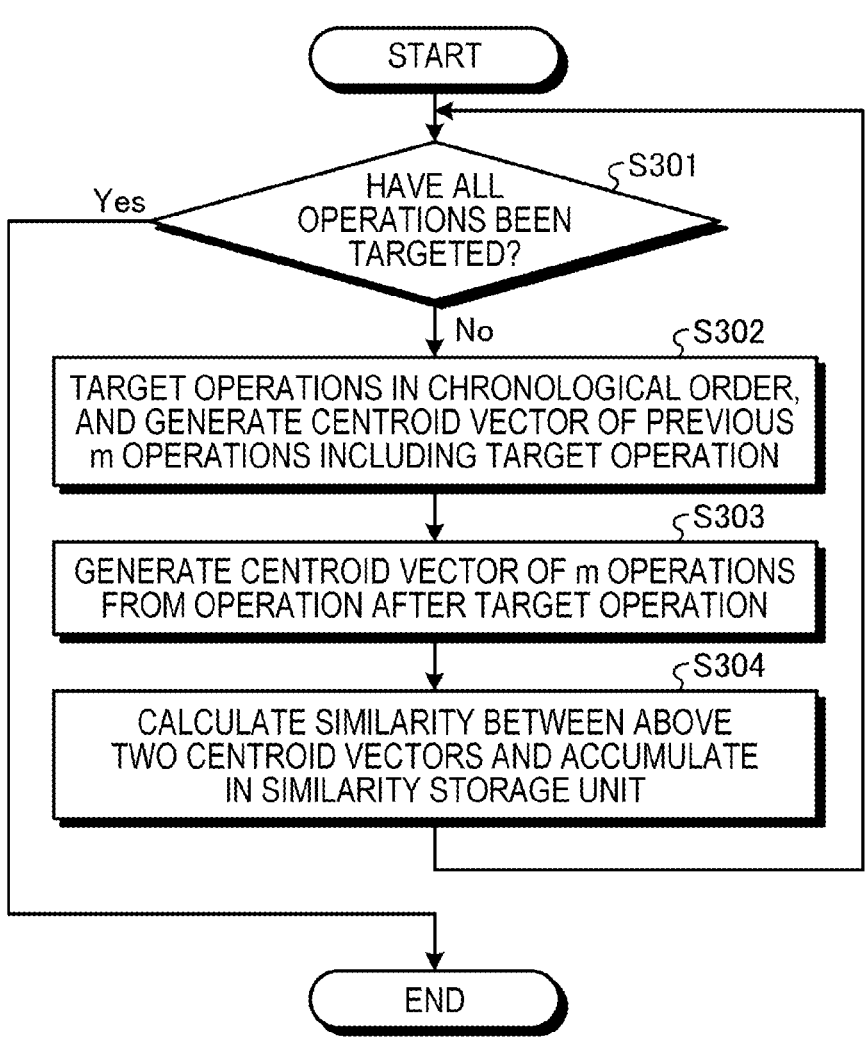
FIG. 23 is a flowchart illustrating an example of a processing procedure of similarity calculation processing according to the embodiment.
Figure 24:
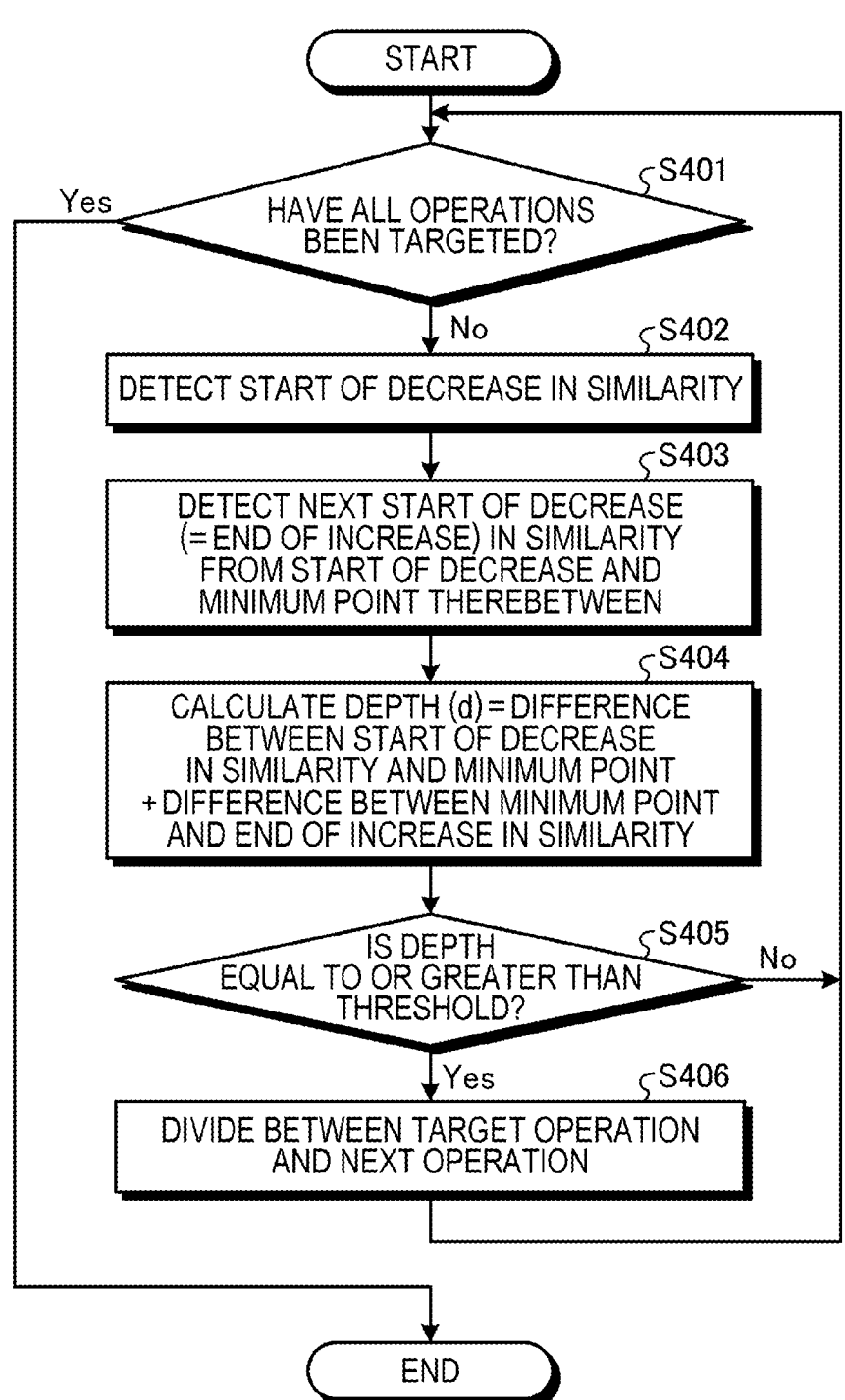
FIG. 24 is a flowchart illustrating an example of a processing procedure of operation log division processing according to the embodiment.
Figure 25:
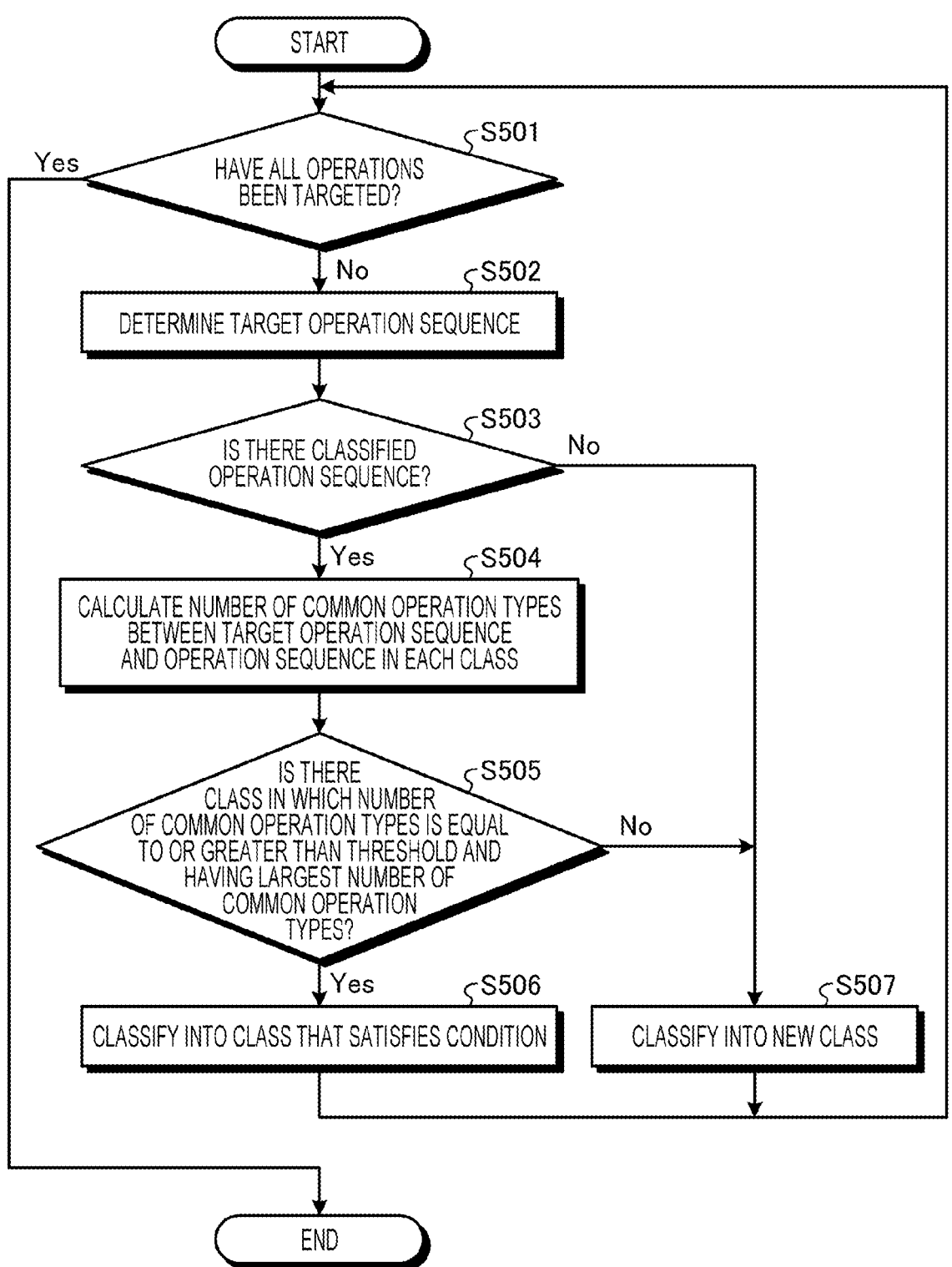
FIG. 25 is a flowchart illustrating an example of a processing procedure of operation sequence classification processing according to the embodiment.

Next, a processing procedure of the classification processing performed by the classification device 10 will be described with reference to FIGS. 21 to 25. FIG. 21 is a flowchart illustrating an example of a processing procedure of operation log acquisition processing according to the embodiment. FIG. 22 is a flowchart illustrating an example of a processing procedure of operation vector generation processing according to the embodiment. FIG. 23 is a flowchart illustrating an example of a processing procedure of similarity calculation processing according to the embodiment. FIG. 24 is a flowchart illustrating an example of a processing procedure of operation log division processing according to the embodiment. FIG. 25 is a flowchart illustrating an example of a processing procedure of operation sequence classification processing according to the embodiment.

First, a processing procedure of operation log acquisition processing will be described with reference to FIG. 21. As illustrated in FIG. 21, the operation log acquisition unit 21 of the terminal device 20 determines whether the user has stopped processing or turned off a PC terminal (step S101). As a result, when the user stops processing or turns off a PC terminal (Yes in step S101), the operation log acquisition unit 21 ends the operation log acquisition processing.

In addition, in a case where the user has not stopped the processing and has not turned off the PC terminal (No in step S101), the operation log acquisition unit 21 acquires an operation log (step S102), returns to the processing in step S101, and repeats the above processing.

Next, a processing procedure of operation vector generation processing will be described with reference to FIG. 22. As illustrated in FIG. 22, the operation vector creation unit 12b of the classification device 10 determines whether all operations identified by the same operation identification unit 12a have been targeted in the processing of step S202 described later (step S201). As a result, if not all the operations have been targeted (No in step S201), the operation vector creation unit 12b targets the operations in chronological order, counts the previous and subsequent n operations, reflects the counted number in the co-occurrence matrix (step S202), and returns to the processing in step S201 to repeat the above processing.

If all the operations have been targeted (Yes in step S201), the operation vector creation unit 12b generates an operation vector of each operation from the co-occurrence matrix (step S203), and ends the operation vector generation processing.

Next, a processing procedure of similarity calculation processing will be described with reference to FIG. 23. As illustrated in FIG. 23, the similarity calculation unit 12c determines whether all the operations performed in time series have been targeted for the processing of steps S302 to 304 described later (step S301). As a result, if not all the operations performed in time series have been targeted (No in step S301), the similarity calculation unit 12c targets the operations in chronological order and generates the centroid vector of the previous m operations including the target operation (step S302).

Then, the similarity calculation unit 12c generates the centroid vector of m operations from the operation after the target operation (step S303). Subsequently, the similarity calculation unit 12c calculates the similarity between the two centroid vectors, accumulates the similarity in the similarity storage unit 13b (step S304), and returns to the processing of step S301 to repeat the above processing. In addition, if all the operations have been targeted (Yes in step S301), the similarity calculation unit 12c ends the similarity calculation processing.

Next, a processing procedure of operation log division processing will be described with reference to FIG. 24. As illustrated in FIG. 24, the determination unit 12d of the classification device 10 determines whether all the operations performed in time series have been targeted (step S401). As a result, if not all the operations performed in time series have been targeted (No in step S401), the determination unit 12d detects the start of decrease in similarity (step S402).

Then, the determination unit 12d detects the next start of decrease (end of increase) in similarity from the start of decrease and the minimum point therebetween (step S403). Subsequently, the determination unit 12d calculates a difference ($d_1$) between the start of decrease in similarity and the minimum point+a difference ($d_2$) between the minimum point and the end of increase in similarity as the depth (d) (step S404).

Then, the determination unit 12d determines whether the depth (d) is equal to or greater than a threshold (step S405). As a result, if the determination unit 12d determines that the depth (d) is not equal to or greater than the threshold (No in step S405), the processing returns to step S401. When determining that the depth (d) is equal to or greater than the threshold (Yes in step S405), the determination unit 12d divides the operation log between the target operation and the next operation (step S406), and returns to step S401. In addition, if all the operations have been targeted (Yes in step S401), the determination unit 12d ends the operation log division processing.

Next, a processing procedure of operation sequence classification processing will be described with reference to FIG. 25. As illustrated in FIG. 25, the classification unit 12e of the classification device 10 determines whether all the operation sequences (operation sets) divided by the determination unit 12d have been targeted (step S501). As a result, if it is determined that not all the operation sequences (operation sets) have been targeted (No in step S501), the classification unit 12e determines the target operation sequence (step S502). For example, the classification unit 12e may determine the target operation sequence in chronological order, or may determine the target operation sequence in descending order of the types of operations in the operation sequence.

Then, the classification unit 12e determines whether there is a classified operation sequence (step S503). That is, the classification unit 12e determines whether the classification processing for the target operation sequence is initial processing. As a result, if there is no classified operation sequence (No in step S503), the classification unit 12e classifies the target operation sequence into a new class (step S507), and returns to step S501.

In addition, if there is a classified operation sequence (Yes in step S503), the classification unit 12e calculates the number of common operation types between the target operation sequence and the operation sequence in each class (step S504). Then, the classification unit 12e determines whether there is a class in which the number of common operation types is equal to or greater than a threshold and having the largest number of common operation types (step S505). As a result, if there is a class in which the number of common operation types is equal to or greater than the threshold and having the largest number of common operation types (Yes in step S505), the classification unit 12e classifies the target operation sequence into a class that satisfies the condition (step S506), and returns to step S501.

In addition, if there is no class in which the number of common operation types is equal to or greater than the threshold (No in step S505), the classification unit 12e classifies the target operation sequence into a new class (step S507), and returns to step S501. In addition, in step S501, if all the operation sequences have been targeted (Yes in step S501), the operation sequence classification processing is ended.

Effects of Embodiment

As described above, the classification device 10 according to the embodiment acquires an operation log related to operation information, identifies each operation performed by the user using the operation log, and creates the vector of each operation on the basis of the co-occurrence relationship between the identified operations. Then, the classification device 10 calculates the similarity between a predetermined number of operations adjacent to each other in chronological order using the created vector of each operation, determines a division point of the operations using the calculated similarity, and divides the time-series operation into operation sets on the basis of the division point. Then, the classification device 10 classifies the operation sets into classes on the basis of the number of types of operations common to the operation sets. Therefore, the classification device 10 can easily and accurately classify a group of work from the start to the end.

For example, conventionally, there have been a method of manually grasping the work time, the number of times, and the procedure, a method of manually assigning a label for each work to the operation log, and the like, but the manual methods haven taken time and effort. On the other hand, since the classification device 10 automatically classifies works (group of operations) of an operation log, it is possible to extract groups of a series of works from the operation log and classify the groups into work types without taking time and effort such as labeling.

As described above, in the classification device 10, a co-occurrence matrix obtained by counting operation sets occurring before and after any operation in an operation log is created to generate a vector for each operation, the similarity is compared with a centroid vector (or sum vector) calculated for the preceding and subsequent operation sets, and the operation log is divided with a part where the similarity satisfies a minimum point or a maximum point and a threshold as a division point of the operation, so that it is possible to extract a group of works from the start to the end and to easily grasp a series of works for introducing RPA.

Modification

In the above-described embodiment, parameters used in various processing may be set automatically. For example, a classification device may automatically set and update "n" that is a parameter used in the processing of the operation vector creation unit 12*b*, "m" that is a parameter used in the processing of the similarity calculation unit 12*c*, a threshold (hereinafter referred to as D) that is a parameter used in the processing of the determination unit 12*d*, and a threshold (hereinafter referred to as T) that is a parameter used in the processing of the classification unit 12*e*.

Hereinafter, as a modification, a case will be described in which a classification device 10*a* calculates an evaluation value of a classification result using the classification result of classification processing each time the classification processing is performed, and classifies an operation log using a parameter used for the classification result having the highest evaluation value. Note that description of configurations and processing similar to those of the first embodiment will be omitted. By automatically setting the parameter, the classification device 10*a* according to the modification can automatically set an optimal parameter without taking time and effort to set the parameter while manually performing trial and error.

Configuration of Classification Device

FIG. 26 is a block diagram illustrating an example of a configuration of the classification device according to the modification. As illustrated in FIG. 26, the classification device 10*a* according to the modification is different from the classification device 10*a* illustrated in FIG. 1 in that an evaluation unit 12*f* and an evaluation result storage unit 13*c* are included.

The evaluation result storage unit 13*c* stores an evaluation value calculated by the evaluation unit 12*f* described later and a parameter in association with each other. For example, as illustrated in FIG. 27, the evaluation result storage unit 13*c* stores, as parameters, "n" that is a parameter used in processing of an operation vector creation unit 12*b*, "m" that is a parameter used in processing of a similarity calculation unit 12*c*, "D" that is a parameter used in processing of a determination unit 12*d*, and "T" that is a parameter used in processing of a classification unit 12*e*. In the example of FIG. 7, the evaluation result storage unit 13*c* stores values of evaluation of classification results of the operation log performed using the parameters "n", "m", "D", and "T" in association with these parameters.

The evaluation unit 12*f* calculates an evaluation value of a classification result by using the classification result of classification processing each time the classification processing is performed by the classification unit 12*e*. For example, in order to focus on an operation type (operation performed in screen) of each clustered operation sequence, the evaluation unit 12*f* converts the operation type into a vector such as bag-of-words. Specifically, the evaluation unit 12*f* sets the number of dimensions of the vector as the number of operation types, and sets an element corresponding to an operation type in the operation sequence to "1". Note that not only the operation type but also the type of the screen in the operation sequence may be included in the vector.

Here, since a vector in a case where there are many operation types and there are few operations included in one operation sequence is a sparse vector (most of them are 0), it may be difficult to grasp the feature. Therefore, the evaluation unit 12*f* may perform dimension reduction on the vector by a method such as t-SNE. Here, t-SNE is a method of compressing high-dimensional data so that data that is similar can be kept close and data that is not similar can be kept far.

Then, the evaluation unit 12*f* evaluates the classification result using, for example, an evaluation index such as a silhouette coefficient. The silhouette coefficient is a method that focuses on an average of vector distances between operation sequences in a cluster and an average of vector distances between operation sequences between other clusters, and is calculated such that the silhouette coefficient increases when the operation sequences in the same cluster are dense and the operation sequences between the other clusters are separated from each other.

Here, a specific example of a method of calculating the evaluation value of the classification result using the silhouette coefficient will be described. First, the evaluation unit 12*f* converts the operation sequence into a vector. The evaluation unit 12*f* sets the number of dimensions of the vector as the number of operation types of the entire operation log, sets an element corresponding to an operation appearing in the operation sequence to "1", and sets the other elements to "0". For example, in a case where the number of operation types is 10 in the operation sequence={operation 1, operation 2, operation 3}, the vector is [1, 1, 1, 0, 0, 0, 0, 0, 0, 0]. In this vector example, the position of each element corresponds to the operation type.

Then, the evaluation unit 12*f* calculates the silhouette count by the following Formula (4).

[Math. 4]

$$\text{Silhouette coefficient} = \frac{b-a}{\max(b, a)} \quad (4)$$

In the following Formula (4), "a" is an average of distances between vectors of operation sequences of the same class, and "b" sis an average of distances between vectors of operation sequences of different classes. The evaluation unit 12*f* calculates the distance of the vector by the following Formula (5).

[Math. 5]

$$\text{Distance} \atop \text{of vector} = \sqrt{\sum_{i=1}^{n} (q_i - p_i)^2} \qquad (5)$$

In this manner, the evaluation unit 12f calculates the silhouette count as the evaluation value. That is, in a case where the operation sequences in the same cluster are densely arranged and the operation sequences between the other clusters are separated from each other, the silhouette coefficient becomes high. Therefore, the higher the silhouette count, the higher the evaluation of the classification result.

In this manner, after calculating the evaluation value from the classification result, the evaluation unit 12f stores the evaluation value and the parameter in association with each other in the similarity storage unit 13b. Then, the classification device 10A performs a series of processing for classifying the operation log by changing the parameter until a parameter search end condition is satisfied, and repeats the processing of calculating the evaluation value of the classification result.

For example, in order to search for a parameter optimal for the classification of the operation log, the classification device 10A determines a setting range of each parameter, and classifies the operation log and calculates the evaluation value while changing the parameter until a condition is satisfied using a method such as grid search or Bayesian optimization. For example, in a case where the grid search method is used, the evaluation unit 12f sets the ranges of the parameters "n", "m", "D", and "T" as illustrated in FIG. 28, and after all combinations are tried, the parameter search is ended. Note that in the example of FIG. 28, the parameter "T" is illustrated as a threshold in a case where the classification unit 12e classifies the operation set on the basis of a threshold using the hierarchical clustering method, but the parameter "T" is not limited thereto.

Then, when the parameter search end condition is satisfied, the operation vector creation unit 12b, the similarity calculation unit 12c, the determination unit 12d, and the classification unit 12e perform the operation log classification processing using the parameters having the best evaluation result.

That is, the operation vector creation unit 12b performs processing of creating a vector of each operation using the parameter used for the classification result having the highest evaluation value calculated by the evaluation unit 12f. For example, as described above, when creating a co-occurrence matrix indicating a co-occurrence relationship between operations, the operation vector creation unit 12b applies the parameter "n" used for the classification result having the highest evaluation value, and creates a co-occurrence matrix in which n operations before and after each operation are counted.

Furthermore, the similarity calculation unit 12c performs processing of calculating the similarity using the parameter used for the classification result having the highest evaluation value calculated by the evaluation unit 12f. For example, as described above, the similarity calculation unit 12c calculates a centroid vector or a sum vector for a predetermined number of operation sequences adjacent to each other in chronological order, applies the parameter "m" used at the time of the classification result having the highest evaluation value when calculating the similarity between the vectors, and calculates the centroid vector or the sum vector using each of the operation vectors of the operation sequence (operation$_{i-m}$, . . . , operation$_i$) of previous m operations including the operation$_i$ to be divided and the operation sequence (operation$_{i+1}$, . . . , operation$_{i+1+m}$) of m operations after the operations.

In addition, the determination unit 12d performs processing of dividing the operation set using the parameter used for the classification result having the highest evaluation value calculated by the evaluation unit 12f. For example, as described above, when determining the division point of the operations and dividing the time-series operation into operation sets on the basis of the division point, the determination unit 12d applies the parameter "D" used at the time of the classification result having the highest evaluation value, and if the calculated depth is equal to or greater than the threshold D, the part of the minimum point (or maximum point) is set as the division point of the work and divides the operation log.

In addition, the classification unit 12e performs classification processing using the parameter used for the classification result having the highest evaluation value calculated by the evaluation unit 12f. For example, as described above, the classification unit 12e applies the parameter "T" used for the classification result having the highest evaluation value when classifying the operation sets into classes on the basis of the number of types of operations common between the operation sets, classifies the operation set to be classified into a class in which the number of common operation types is equal to or greater than the threshold T and having the largest number of common operation types, and classifies the operation set as a new class when the number of types of common operations is equal to or smaller than the threshold T.

Processing Procedure of Classification Device

Figure 29:
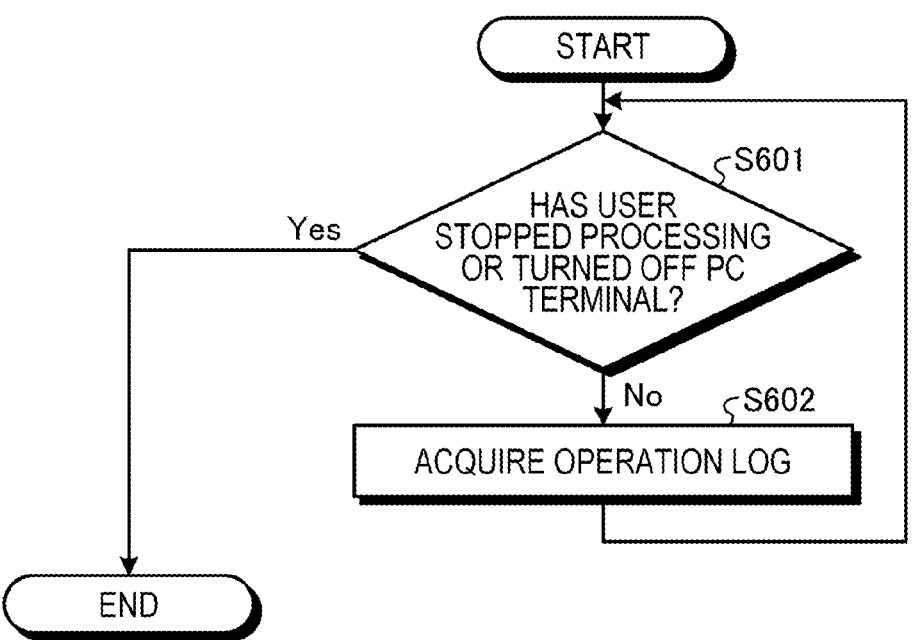
FIG. 29 is a flowchart illustrating an example of a processing procedure of operation log acquisition processing according to the modification.
Figure 30:
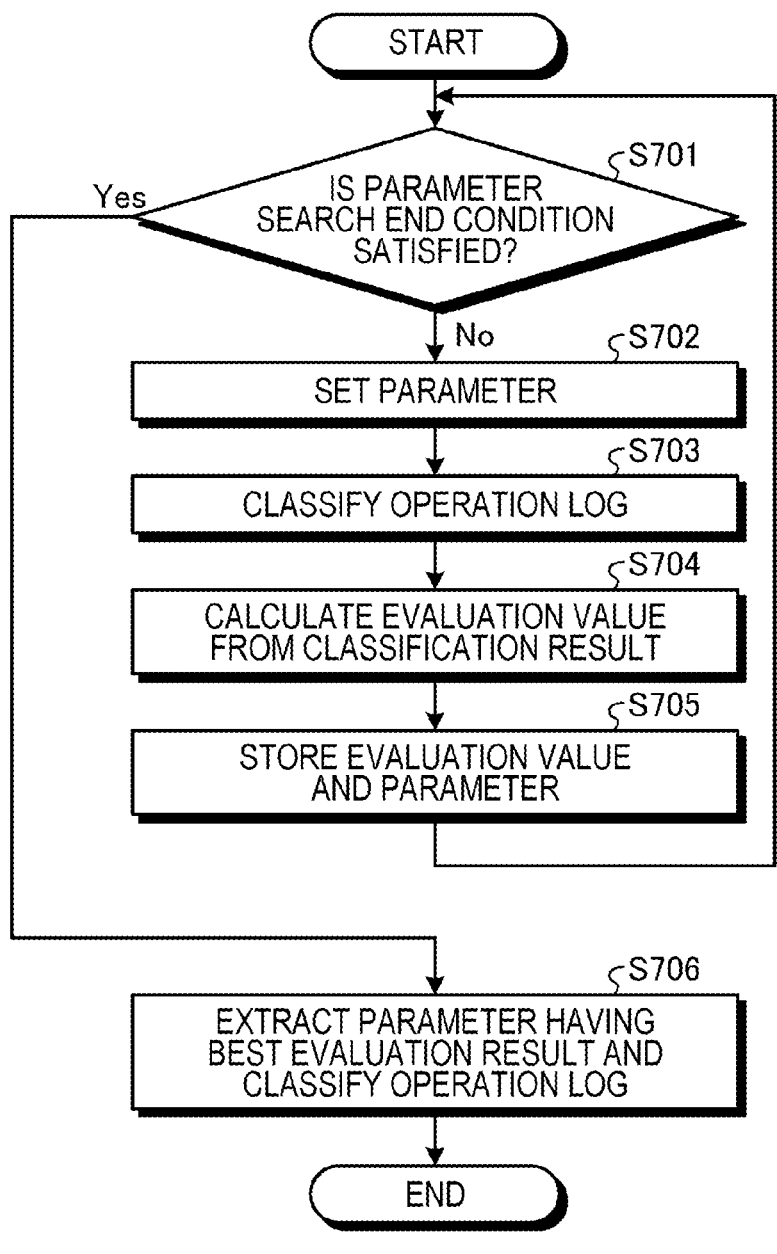
FIG. 30 is a flowchart illustrating an example of a processing procedure of classification processing according to the modification.

Next, a processing procedure of classification processing performed by the classification device 10A will be described with reference to FIGS. 29 and 30. FIG. 29 is a flowchart illustrating an example of a processing procedure of operation log acquisition processing according to the modification. FIG. 30 is a flowchart illustrating an example of a processing procedure of classification processing according to the modification.

First, a processing procedure of operation log acquisition processing will be described with reference to FIG. 29. As illustrated in FIG. 29, an operation log acquisition unit 21 of a terminal device 20 determines whether the user has stopped processing or turned off a PC terminal (step S601). As a result, when the user stops processing or turns off a PC terminal (Yes in step S601), the operation log acquisition unit 21 ends the operation log acquisition processing.

In addition, in a case where the user has not stopped the processing and has not turned off the PC terminal (No in step S601), the operation log acquisition unit 21 acquires an operation log (step S602), returns to the processing in step S601, and repeats the above processing.

Next, a processing procedure of classification processing will be described with reference to FIG. 30. As illustrated in FIG. 30, the evaluation unit 12f of the classification device 10A determines whether a parameter search condition is satisfied (step S701). As a result, if it is determined that the parameter search condition is not satisfied (No in step S701), the evaluation unit 12f sets a parameter (step S702). Then, a same operation identification unit 12a, the operation vector creation unit 12b, the similarity calculation unit 12c, the determination unit 12d, and the classification unit 12e perform a series of processing for classifying the operation log using the set parameters (step S703).

Then, the evaluation unit 12*f* calculates an evaluation value from the classification result (step S704), stores the evaluation value and the parameter in the evaluation result storage unit 13*c* (step S705), and returns to the processing of step S701.

In step S701, if the evaluation unit 12*f* determines that the parameter search condition is satisfied (Yes in step S701), the same operation identification unit 12*a*, the operation vector creation unit 12*b*, the similarity calculation unit 12*c*, the determination unit 12*d*, and the classification unit 12*e* perform a series of processing for extracting a parameter having the best evaluation result from the evaluation result storage unit 13*c* and classifying the operation log (step S706).

Effects of Embodiment

As described above, each time classification processing is performed, the classification device 10 according to the embodiment calculates an evaluation value of a classification result using the classification result of the classification processing, and classifies an operation log using a parameter used for the classification result having the highest evaluation value. Therefore, the classification device 10 can automatically set the optimal parameter and then automatically perform the optimal operation log classification processing without requiring the user to manually set the parameter.

System Configuration of Embodiment

Each component of the classification devices 10 and 10A illustrated in FIGS. 1 and 26 is functionally conceptual, and does not necessarily need to be physically configured as illustrated. That is, a specific form of distribution and integration of the functions of the classification devices 10 and 10A is not limited to the illustrated form, and all or a part thereof can be functionally or physically distributed or integrated in an arbitrary unit according to various loads, usage conditions, and the like.

In addition, all or an arbitrary part of each processing performed in the classification devices 10 and 10A may be implemented by a CPU and a program analyzed and executed by the CPU. Furthermore, each processing performed in the classification devices 10 and 10A may be implemented as hardware by wired logic.

Further, among the processing described in the embodiments, all or part of the processing described as being automatically performed can be manually performed. Alternatively, all or part of the processing described as being performed manually can be automatically performed by a known method. In addition, the above-described and illustrated processing procedures, control procedures, specific names, and information including various data and parameters can be appropriately changed unless otherwise specified.

Program

Figure 31:
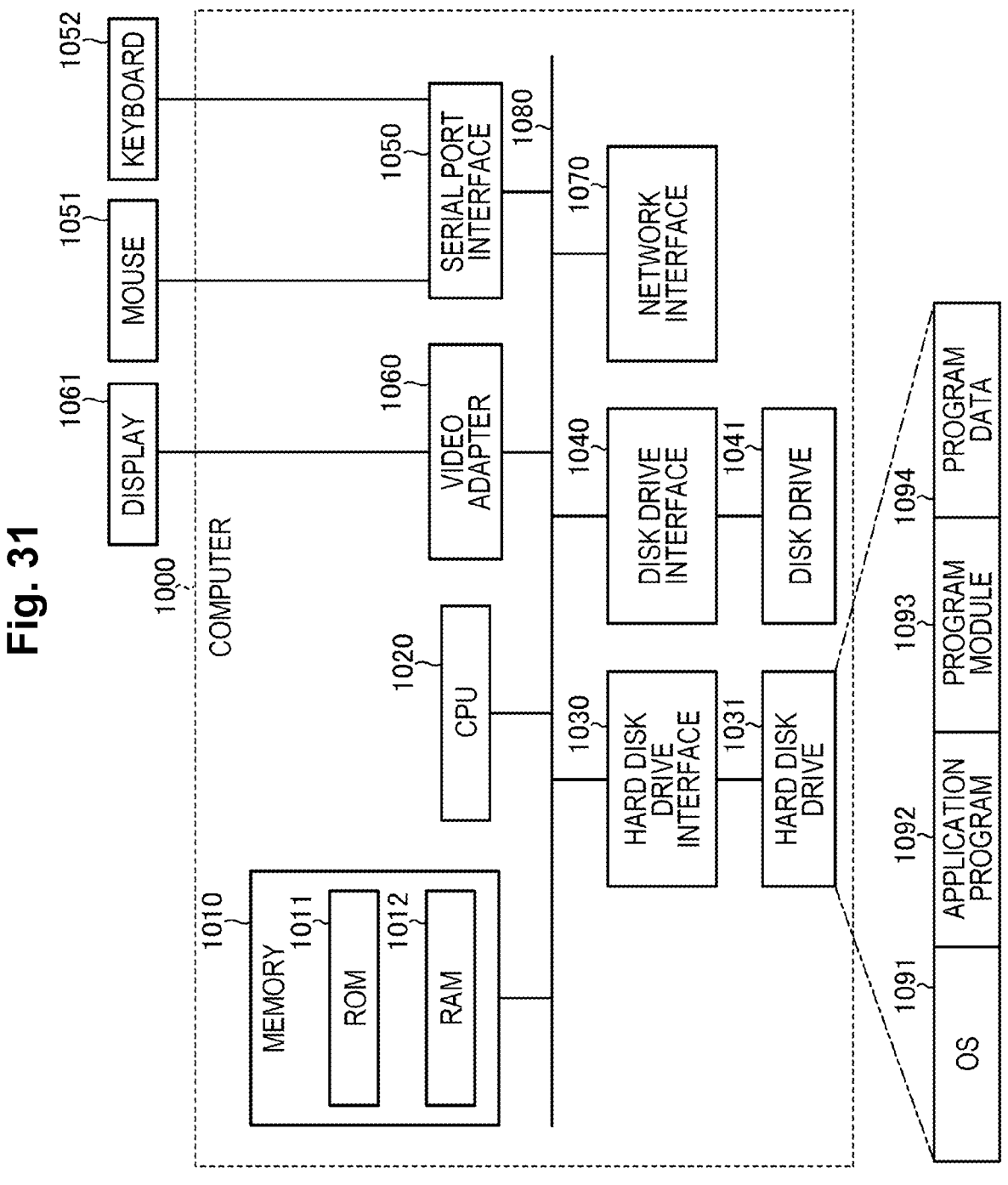
FIG. 31 is a diagram illustrating an example of a computer in which the classification device is implemented by executing a program.

FIG. 31 is a diagram illustrating an example of a computer in which the classification device 10, 10A is implemented by executing a program. A computer 1000 includes, for example, a memory 1010 and a CPU 1020. The computer 1000 further includes a hard disk drive interface 1030, a disk drive interface 1040, a serial port interface 1050, a video adapter 1060, and a network interface 1070. These units are connected to each other by a bus 1080.

The memory 1010 includes a ROM 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, the program that defines each processing of the classification device 10, 10A is implemented as the program module 1093 in which a code executable by the computer 1000 is described. The program module 1093 is stored in, for example, the hard disk drive 1090. For example, the program module 1093 for executing processing similar to the functional configuration in the classification device 10, 10A is stored in the hard disk drive 1090. Note that the hard disk drive 1090 may be replaced with a solid state drive (SSD).

Further, setting data used in the processing of the embodiment described above is stored, for example, in the memory 1010 or the hard disk drive 1090 as the program data 1094. Then, the CPU 1020 reads and executes the program module 1093 and the program data 1094 stored in the memory 1010 and the hard disk drive 1090 to the RAM 1012 as necessary.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from the other computer via the network interface 1070.

While the embodiments to which the invention made by the present inventors is applied have been described above, the present invention is not limited by the description and drawings constituting a part of the disclosure of the present invention according to the present embodiments. That is, other embodiments, examples, operation techniques, and the like made by those skilled in the art and the like on the basis of the present embodiment are all included in the scope of the present invention.

REFERENCE SIGNS LIST 10, 10A Classification device
11 Communication unit
12 Control unit
12*a* Same operation identification unit
12*b* Operation vector creation unit
12*c* Similarity calculation unit
12*d* Determination unit
12*e* Classification unit
12*f* Evaluation unit
13 Storage unit
13*a* Operation log storage unit
13*b* Similarity storage unit
13*c* Evaluation result storage unit
20 Terminal device
21 Operation log acquisition unit

The invention claimed is:

1. A classification device comprising:

processing circuitry configured to:

acquire an operation log related to operation information and identify each operation performed by a user using the operation log;

create a vector of each operation based on a co-occurrence relationship between operations identified;

calculate a similarity between a predetermined number of operations adjacent to each other in chronological order by using the vector of each operation created;

determine a division point of operations by using the similarity calculated and divide a time-series operation into operation sets based on the division point; and classify the operation sets divided into classes based on a number of types of operations common to the operation sets.

2. The classification device according to claim 1, wherein for each operation identified, the processing circuitry is further configured to count a number of times of other operations performed in a range of a predetermined number before and after the operation in an operation sequence performed in time series, create a co-occurrence matrix indicating a co-occurrence relationship between the operations by using the counted number of times, and create a vector of each operation based on the co-occurrence matrix.

3. The classification device according to claim 2, wherein for each operation identified, the processing circuitry is further configured to create the co-occurrence matrix by using values obtained by weighting the number of times of other operations performed in the range of the predetermined number before and after the operation in the operation sequence performed in time series, according to distances to the other operations, and create a vector of each operation based on the co-occurrence matrix.

4. The classification device according to claim 2, wherein for each operation identified, the processing circuitry is further configured to create the co-occurrence matrix by using values obtained by weighting the number of times of other operations performed in the range of the predetermined number before and after the operation in the operation sequence performed in time series, according to whether or not the other operations have been performed in a same window, and create a vector of each operation based on the co-occurrence matrix.

5. The classification device according to claim 1, wherein in a case where a type of operation identified is equal to or greater than a predetermined threshold, the processing circuitry is further configured to create a vector of each operation using a predetermined dimension reduction method.

6. The classification device according to claim 1, wherein the processing circuitry is further configured to calculate a centroid vector or a sum vector for a predetermined number of operation sequences adjacent to each other in chronological order using the vector of each operation created, and calculate a similarity between vectors.

7. The classification device according to claim 1, wherein the processing circuitry is further configured to:

calculate an evaluation value of a classification result by using the classification result of classification processing each time the classification processing is performed, perform processing of creating a vector of each operation by using a parameter used for a classification result having a highest evaluation value calculated, perform processing of calculating the similarity by using a parameter used for a classification result having a highest evaluation value calculated, perform processing of dividing the operation set by using a parameter used for a classification result having a highest evaluation value calculated, and perform the classification processing by using a parameter used for a classification result having a highest evaluation value calculated.

8. A classification method executed by a classification device, the classification method comprising:

acquiring an operation log related to operation information and identifying each operation performed by a user using the operation log;

creating a vector of each operation based on a co-occurrence relationship between operations identified;

calculating a similarity between a predetermined number of operations adjacent to each other in chronological order by using the vector of each operation created;

determining a division point of operations by using the similarity calculated and dividing a time-series operation into operation sets based on the division point; and classifying the operation sets divided into classes based on a number of types of operations common to the operation sets.

9. A non-transitory computer-readable recording medium storing therein a classification program that causes a computer to execute a process comprising:

acquiring an operation log related to operation information and identifying each operation performed by a user using the operation log;

creating a vector of each operation based on a co-occurrence relationship between operations identified;

calculating a similarity between a predetermined number of operations adjacent to each other in chronological order by using the vector of each operation created;

determining a division point of operations by using the similarity calculated and dividing a time-series operation into operation sets based on the division point; and classifying the operation sets divided into classes based on a number of types of operations common to the operation sets.

* * * * *